United States Patent
Kojima

(10) Patent No.: US 11,711,032 B2
(45) Date of Patent: Jul. 25, 2023

(54) VIBRATION-TYPE ACTUATOR AND ELECTRONIC APPARATUS INCLUDING THE SAME

(71) Applicant: CANON KABUSHIKI KAISHA, Tokyo (JP)

(72) Inventor: Nobuyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 17/545,827

(22) Filed: Dec. 8, 2021

(65) Prior Publication Data

US 2022/0190745 A1 Jun. 16, 2022

(30) Foreign Application Priority Data

Dec. 16, 2020 (JP) .................. 2020-208356

(51) Int. Cl.
*H02N 2/10* (2006.01)
*G03B 13/36* (2021.01)

(52) U.S. Cl.
CPC ............. *H02N 2/103* (2013.01); *G03B 13/36* (2013.01)

(58) Field of Classification Search
CPC .... H02N 2/103; H02N 2/0015; H02N 2/0055; G03B 3/10; G03B 13/36; G03B 2205/0061
See application file for complete search history.

(56) References Cited

U.S. PATENT DOCUMENTS

2020/0235678 A1* 7/2020 Kimura .................. H02N 2/008

FOREIGN PATENT DOCUMENTS

JP 2017200260 A 11/2017

* cited by examiner

*Primary Examiner* — Emily P Pham
(74) *Attorney, Agent, or Firm* — Canon U.S.A., Inc. I.P. Division

(57) ABSTRACT

A vibration-type actuator includes a vibrator, a contact body, a pressure member, a holding member, and a base. The vibrator has an elastic member and an electro-mechanical energy conversion element fixed to the elastic member. The contact body contacts the vibrator. The pressure member presses the contact body and the vibrator in a first direction. The holding member holds the vibrator and includes a support portion and at least one fitting hole portion extending in the first direction. The support portion supports the vibrator movably in the first direction. The base holds the holding member. The contact body moves relative to the vibrator in a second direction intersecting the first direction. The base includes at least one fitting protrusion portion extending in the first direction and fits in the at least one fitting hole portion.

16 Claims, 27 Drawing Sheets

MODE A

MODE B

VIBRATION-TYPE ACTUATOR AND ELECTRONIC APPARATUS INCLUDING THE SAME

BACKGROUND

Field

The present disclosure relates to a vibration-type actuator and an electronic apparatus including the vibration-type actuator.

Description of the Related Art

There has been known a vibration wave motor (vibration-type actuator) that uses a vibrating body (vibrator) on a flat plate and that includes an elastic member and an electro-mechanical energy conversion element fixed onto the elastic member. Such a vibration-type actuator causes the vibrator and the driven body (contact body) in pressure contact with the vibrator to move relative to each other by vibration generated by the vibrator.

In such a vibration-type actuator, vibration energy of the vibrator is transmitted to members other than the contact body, which leads to reduction in output efficiency. In addition, the transmission of vibration energy of the vibrator to members other than the contact body produces unwanted sound (noise).

Japanese Patent Application Laid-Open No. 2017-200260 discusses as a means to solve the above-described issue arms provided at both ends of the elastic member in the longitudinal direction that connect the elastic member and the holding member to each other with the elastic member fixed (joined) to the holding member. The arms support the vibrator on the holding member. To reduce the propagation of vibration from the vibrator to the holding member, the arms are designed to be thin, which has a low rigidity.

However, even the designed configuration that the vibrator is joined to the holding member allows vibration propagation to members other than the contact body, which has room for improvement in output efficiency and noise.

SUMMARY

The present disclosure is directed to a vibration-type actuator that counteracts low output efficiency and noise and an electronic apparatus equipped with the vibration-type actuator.

According to an aspect of the present disclosure, a vibration-type actuator includes a vibrator having an elastic member and an electro-mechanical energy conversion element fixed to the elastic member, a contact body configured to contact the vibrator, a pressure member configured to press the contact body and the vibrator in a first direction, a holding member configured to hold the vibrator and having a support portion and at least one fitting hole portion extending in the first direction, wherein the support portion is configured to support the vibrator movably in the first direction, and a base configured to hold the holding member, wherein the contact body is configured to move relative to the vibrator in a second direction intersecting the first direction, and wherein the base includes at least one fitting protrusion portion extending in the first direction and configured to be fitted in the at least one fitting hole portion.

Further features of the present disclosure will become apparent from the following description of exemplary embodiments with reference to the attached drawings.

DESCRIPTION OF THE EMBODIMENTS

Some exemplary embodiments of the present disclosure will be described in detail below with reference to the accompanying drawings.

Figure 1:
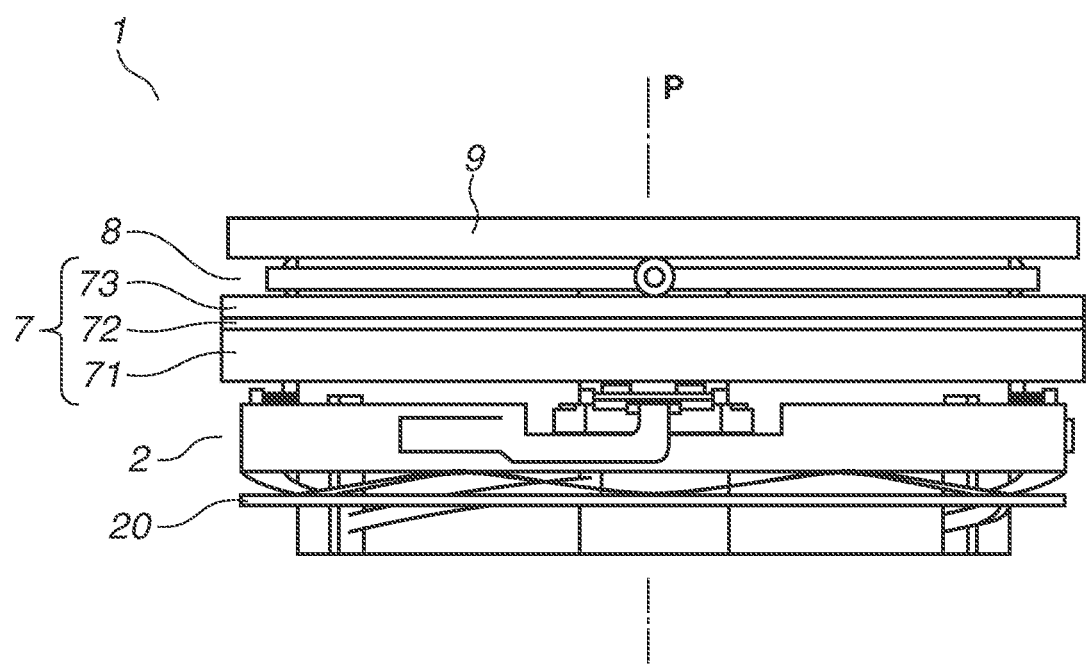
FIG. 1 is a side view illustrating a vibration-type actuator according to a first exemplary embodiment.
Figure 2:
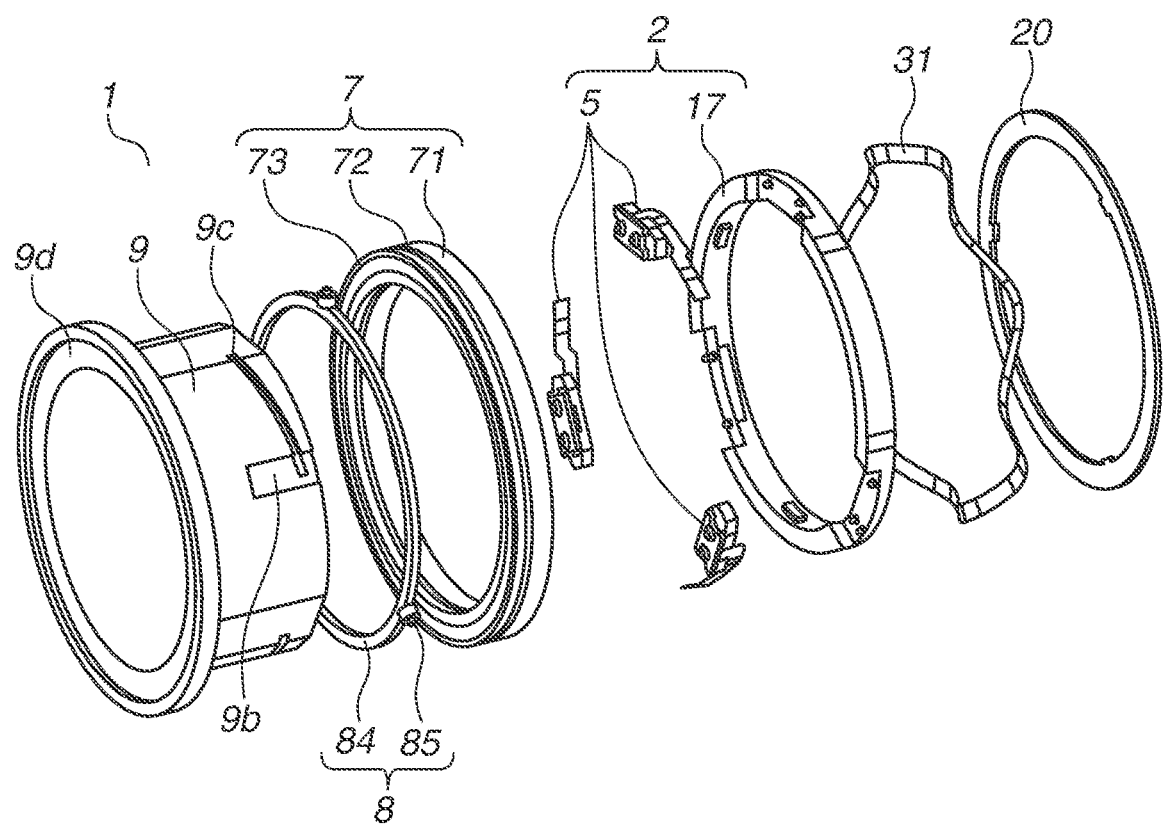
FIG. 2 is an exploded perspective view of the vibration-type actuator illustrated in FIG. 1.

FIG. 1 is a side view illustrating a schematic configuration of a vibration wave motor 1 (vibration-type actuator) according to a first exemplary embodiment. FIG. 2 is an exploded perspective view of the vibration-type actuator 1. The vibration-type actuator 1 includes a fixing member 9, a transmission unit 8, a rotor unit 7, a stator unit 2, a pressure spring 31 (pressure member) in a wave spring shape, and a pressure adjustment ring 20. The vibration-type actuator 1 is assembled from the stator unit 2 in an annular shape, the rotor unit 7 in an annular shape, the transmission unit 8, the pressure spring 31, and the pressure adjustment ring 20, all of which are fitted on a cylindrical portion of the fixing member 9 serving as a base.

The rotor unit 7 is composed of a rotor holder 73, a rotor 71 (contact body), and a transmission rubber 72 sandwiched between the rotor holder 73 and the rotor 71. The rotor unit 7 is fitted on the cylindrical portion of the fixing member 9 with the rotor unit 7 rotatable with respect to the cylindrical portion of the fixing member 9.

The transmission unit 8 is composed of a roller ring 84 and three rollers 85. The rotation axes of the three rollers 85 are orthogonal to the rotation axis P (that coincides with the central axis of the fixing member 9) of the rotor unit 7 in the vibration-type actuator 1. The three rollers 85 are pressed and held by the pressure spring 31, the pressure adjustment ring 20, a flange portion 9d of the fixing member 9, and the rotor holder 73 in the direction of the rotation axis P.

The rotor unit 7 is smoothly rotatable about the rotation axis P by the rotation of the three rollers 85.

The stator unit 2 is composed of three vibrating body units 5 and a base 17 in a substantially annular shape. The vibrating body units 5 are each put in pressure contact with the rotor 71 with the pressure spring 31 and the pressure adjustment ring 20.

The vibrating body units 5 are each placed on the base 17 so that driving force will be generated in the tangential direction of the circle about the rotation axis P. The resultant force of the driving forces generated by the vibrating body units 5 is the rotational driving force about the rotation axis P.

The stator unit 2 is shiftable in the direction of the rotation axis P. However, some parts of the stator unit 2 are fitted in fitting grooves 9c formed in the fixing member 9 to limit the movement about the rotation axis P. Thus, the rotor unit 7 receives the rotational driving force generated by the vibrating body units 5 to rotatably move about the rotation axis P.

The pressure adjustment ring 20 is fixed to a predetermined position on cylindrical portions 9b on the fixing member 9, and the pressure spring 31 is sandwiched between the pressure adjustment ring 20 and the base 17 of the stator unit 2.

The surface of the base 17 to be put in contact with the pressure spring 31 is formed substantially flat. The position of the pressure adjustment ring 20 is adjusted in the direction of the rotation axis P to cause elastic deformation in the pressure spring 31.

Elastic deformation in the pressure spring 31 presses the stator unit 2, the rotor unit 7, and the transmission unit 8 against the flange portion 9d of the fixing member 9, holding the positional relationship between the units. The pressure force together with the driving force generated by the stator unit 2 causes friction force that is transmitted to rotate the rotor unit 7. The pressure force is applied in the same direction as the direction indicated by the rotation axis P.

Figure 3:
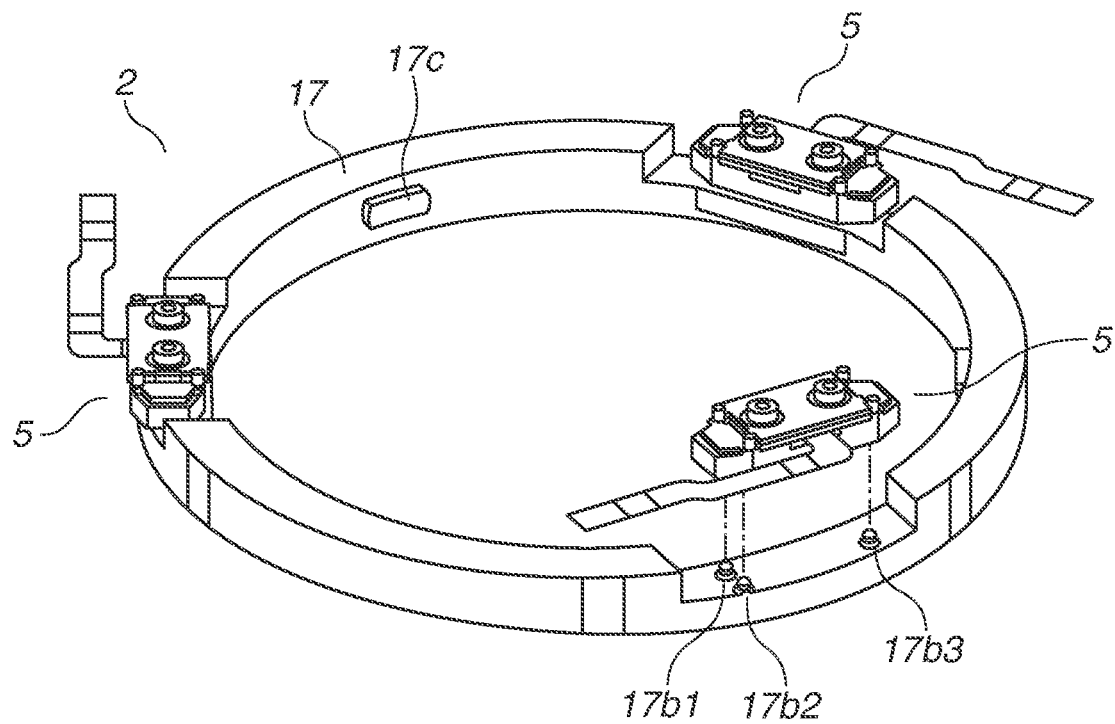
FIG. 3 is a perspective view illustrating the structure of a stator unit of the vibration-type actuator illustrated in FIG. 1.

FIG. 3 is a perspective view of the stator unit 2. FIG. 3 illustrates a single vibrating body unit 5 in a separated state. The base 17 is formed in a substantially ring shape. Protrusion portions 17c are formed on the inner diameter side of the base 17. The protrusion portions 17c are fitted to the fixing member 9, limiting the movement of the protrusion portions 17c in the rotational direction. A first fitting protrusion portion 17b1, a second fitting protrusion portion 17b2, and a third fitting protrusion portion 17b3 are formed as three fitting protrusion portions extending in the direction that coincides with the pressure direction at three locations on the base 17 that is assembled into the stator unit 2.

Figure 4:
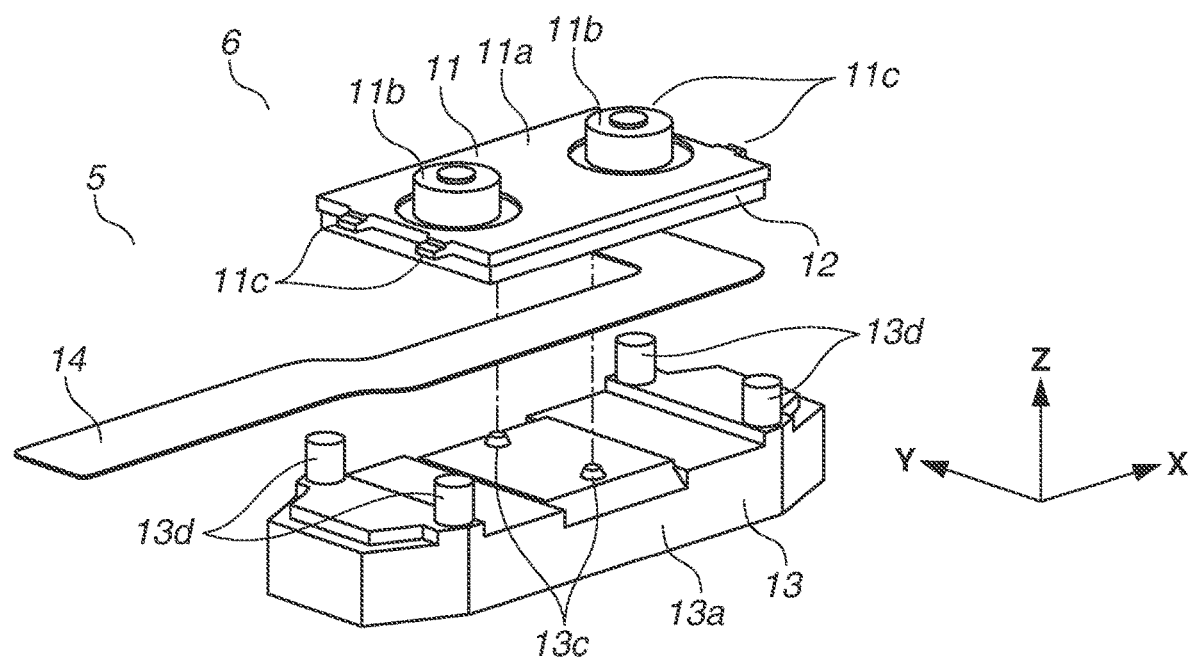
FIG. 4 is an exploded perspective view illustrating the structure of each vibrating body unit illustrated in FIG. 3.

FIG. 4 is a perspective view of a single vibrating body unit 5. For convenience of description, the above-described pressure direction is defined as the Z-direction (first direction). The direction of the force generated by each vibrating body unit 5 (force generated by the motor) is defined as the X-direction (second direction). The direction intersecting with (more suitably orthogonal to) the Z-direction (first direction) and the X-direction (second direction) is defined as the Y-direction (third direction).

Each vibrating body unit 5 is composed of a vibrator 6 and a holding member 13. The vibrator 6 includes an elastic member 11, a piezoelectric element 12 (electro-mechanical energy conversion element), and a flexible substrate 14. The elastic member 11 includes a rectangular portion 11a and two protrusion portions 11b provided on a first surface of the rectangular portion 11a. The elastic member 11 has a plate-like shape. The term "first surface" refers to one of the two surfaces of the rectangular portion 11a that extend in one direction intersecting with (more suitably orthogonal to) the thickness direction of the rectangular portion 11a. The thickness direction coincides with the pressure direction.

The piezoelectric element 12 in a rectangular plate shape is bonded (joined) to a second surface opposite the first surface of the elastic member 11. The elastic member 11 and the piezoelectric element 12 constitute a vibrating body. The flexible substrate 14 to be electrically connected to the piezoelectric element 12 is joined to the surface of the piezoelectric element 12 opposite the surface bonded to the elastic member 11.

The holding member 13 is placed on the surface of the piezoelectric element 12 of the vibrator 6 in alignment with the piezoelectric element 12 in the Z-direction (first direction). The holding member 13 includes two pressure protrusion portions 13c extending in the Z-direction (first direction) from a main body portion 13a. The vibrator 6 is in contact with the two pressure protrusion portions 13c, at which the pressure force acts on the vibrator 6 and the holding member 13.

The holding member 13 is provided with four guide protrusion portions 13d (support portions) extending in the Z-direction (first direction) from the main body portion 13a. The elastic member 11 and the piezoelectric element 12 of the vibrator 6 are surrounded by the guide protrusion portions 13d. The vibrator 6 is supported in a freely movable manner in the Z-direction (first direction) by the four guide protrusion portions 13d. The four guide protrusion portions 13d supports the vibrator 6 to prevent the movement of the vibrator 6 in the X-direction (second direction) and the Y-direction (third direction).

Figure 5A:
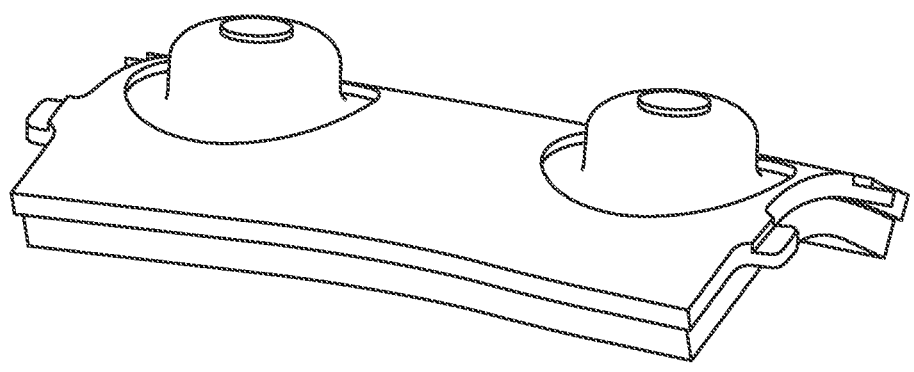
FIGS. 5A and 5B are explanatory diagrams illustrating vibration modes.
Figure 5B:
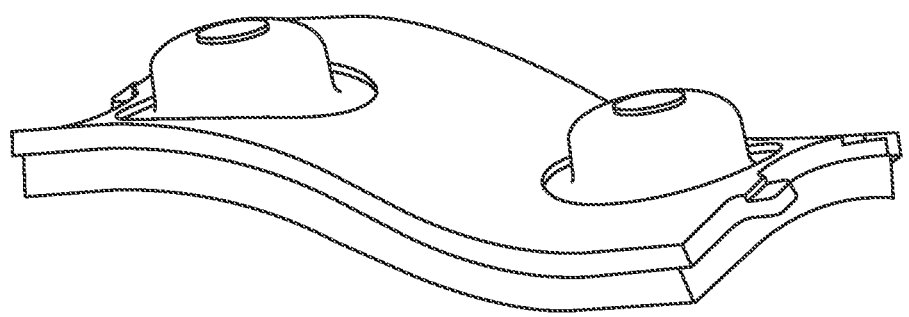

Next, vibration modes excited in the vibrator 6 will be described with reference to FIGS. 5A and 5B. In the present exemplary embodiment, an alternating current (AC) voltage is applied to the piezoelectric element 12 through the flexible substrate 14 to excite two different out-of-plane bending vibrations in the vibrator 6, thereby generating a vibration as a resultant of the vibrations.

A mode "A", which is a first vibration mode, is a primary out-of-plane bending vibration mode in which two nodes appear in parallel to the X-direction in the longitudinal direction of the vibrator 6. The two protrusion portions 11b are shifted in the Z-direction by the vibration in the mode A. A mode "B", which is a second vibration mode, is a secondary out-of-plane bending vibration mode in which three nodes appear substantially in parallel to the Y-direction in the transverse direction of the vibrator 6. The two protrusion portions 11b are shifted in the X-direction by the vibration in the mode B.

The combined vibration in these modes (mode A, mode B) moves the two protrusion portions 11b in an ellipse or a circle on a ZX plane. The contact condition between the rotor 71 (contact body) and the two protrusion portions 11b generates a frictional force in the X-direction, a driving force (thrust force) to move the vibrator 6 and the rotor 71 (contact body) relative to each other.

Figure 6A:
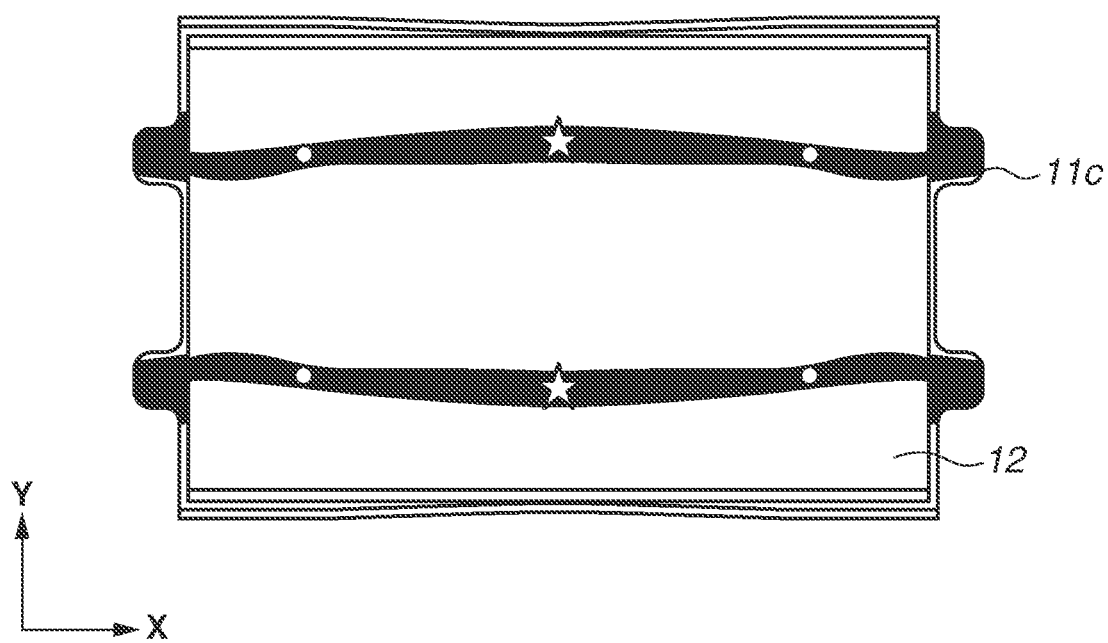
FIGS. 6A and 6B illustrate node positions in the vibration modes.
Figure 6B:
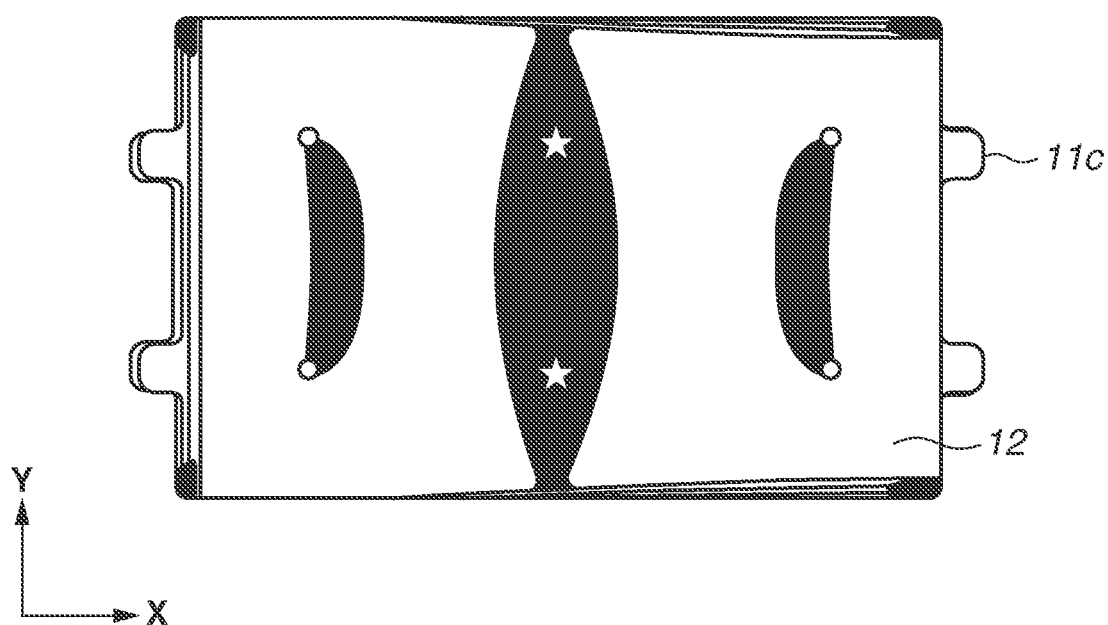

To efficiently drive the vibration-type actuator 1, the vibrator 6 should be supported without inhibiting the vibration (shift) in the two vibration modes excited in the vibrator 6. It thus is suitable that the vibrator 6 is supported in the vicinities of nodes in the two vibration modes. For that reason, the holding member 13 is provided with the two pressure protrusion portions 13c as illustrated in FIG. 4 to press and hold the nodes common to the two vibration modes excited in the vibrator 6. FIGS. 6A and 6B illustrate contact positions and node positions in the vibration modes. FIG. 6A illustrates node positions in the mode A.

FIG. 6B illustrates node positions in the mode B. For simple illustration, the illustration of the flexible substrate 14 is omitted.

In FIGS. 6A and 6B, the portions painted in black indicate the vicinities of the nodes. Specifically, the black areas illustrate 35% or less of the maximum shift in each vibration mode. In the present exemplary embodiment, the area with 35% or less of the maximum shift is defined as a node vicinity. The resultant of the vibration in the mode A and the mode B produces six points in the black areas, common node vicinities (four circles and two stars). The two star points in these six points are suited to support the vibrator 6 efficiently in the following two respects. First, the shifts at the two points are smaller than at the other four. Second, an equalizer function can be exerted around the Y-axis of the protrusion portions 11b and the rotor 71 to make the contact between the protrusion portions 11b and the rotor 71 uniform thanks to one point pressure in the X direction found on the ZX cross-sectional plane.

For that reason, the two star points in FIGS. 6A and 6B each are put in contact with the corresponding one of the pressure protrusion portions 13c, applying a more efficient pressure on the vibrator 6 compared with a simple configuration of applying a uniform surface pressure on the back surface of the vibrator and of uniformly surface supporting it. Further, the vibrator 6 is held in the X-direction and the Y-direction by the frictional force between the pressure protrusion portions 13c and the vibrator 6. In the present exemplary embodiment, the contact between the flexible substrate 14 and the pressure protrusion portions 13c plays a role of adjustment of the pressure and the coefficient of friction to keep that maximum static friction force over the thrust force of the rotor 71 constantly. The pressure like point contact by the pressure protrusion portions 13c reduces the movement of the vibrator 6 relative to the holding member 13 significantly during the driving of the vibration-type actuator 1.

Figure 7:
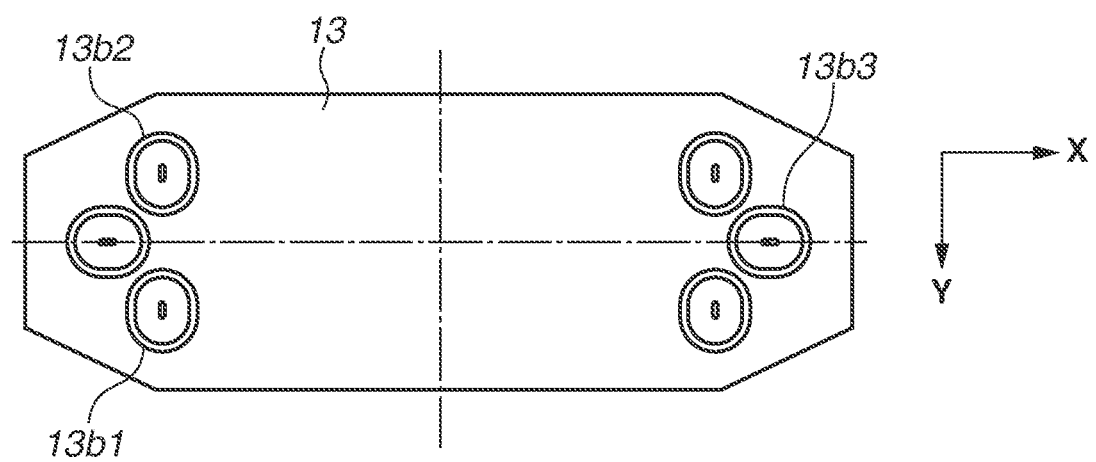
FIG. 7 is a bottom view illustrating the structure of a holding member illustrated in FIG. 4.

FIG. 7 is a bottom view illustrating the holding member 13 as viewed in the −Z-direction. Fitting hole portions are formed at six locations in the surface of the holding member 13 opposite the surface where the vibrator 6 is placed. These fitting hole portions are formed so that the holding member 13 has a symmetrical shape with respect to the X-direction (second direction) and the Y-direction (third direction).

A first fitting hole portion 13b1 and a second fitting hole portion 13b2 formed in the −X-direction and a third fitting hole portion 13b3 formed in the +X-direction among the fitting hole portions are in contact with the first fitting protrusion portion 17b1, the second fitting protrusion portion 17b2, and the third fitting protrusion portion 17b3 of the base 17, respectively. A first contact surface C11, a second contact surface C12, and a third contact surface C13 are formed as three contact surfaces.

The base 17 and the holding member 13 are in contact with each other on the first contact surface C11, the second contact surface C12, and the third contact surface C13. The first fitting hole portion 13b1 and the second fitting hole portion 13b2 have a substantially elliptical shape with long sides in the Y-direction (third direction) as viewed in the Z-direction (first direction), and the bottom portions of the first fitting hole portion 13b1 and the second fitting hole portion 13b2 are inclined in directions. The inclinations will be described below with reference to FIG. 9 and other drawings. The third fitting hole portion 13b3 has a substantially elliptical shape with a long side in the X-direction (second direction) as viewed in the Z-direction (first direction), and the bottom portion of the third fitting hole portion 13b3 is also inclined in directions.

Figure 8:
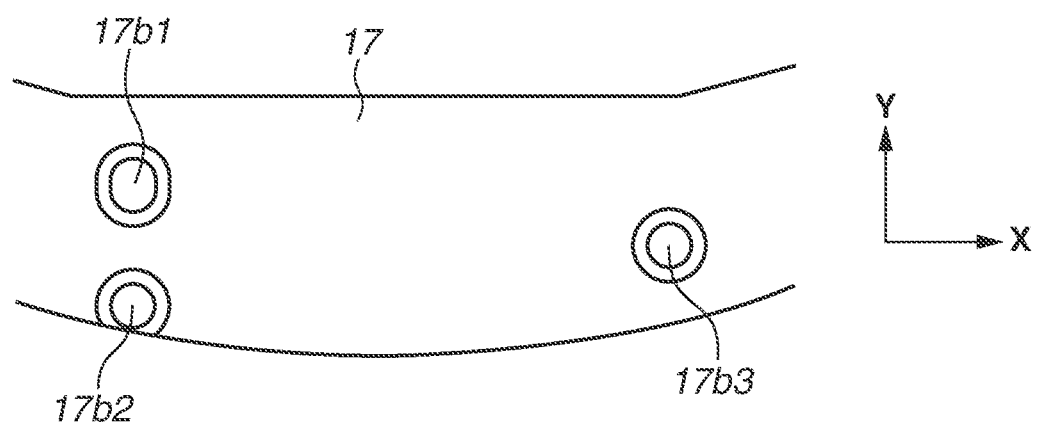
FIG. 8 is a partial plan view illustrating the structure of a base illustrated in FIG. 3.

FIG. 8 is a plan view illustrating a part of the base 17. The first fitting protrusion portion 17b1 to form the first contact surface C11 has a substantially elliptical shape as viewed in the Z-direction (first direction), and the tip end of the first fitting protrusion portion 17b1 is chamfered in directions.

The second fitting protrusion portion 17b2 to form the second contact surface C12 and the third fitting protrusion portion 17b3 to form the third contact surface C13 have in substantially spherical shapes as viewed in the Z-direction (first direction), and the tip ends of the second fitting protrusion portion 17b2 and the third fitting protrusion portion 17b3 are formed in hemispherical shapes.

Figure 9:
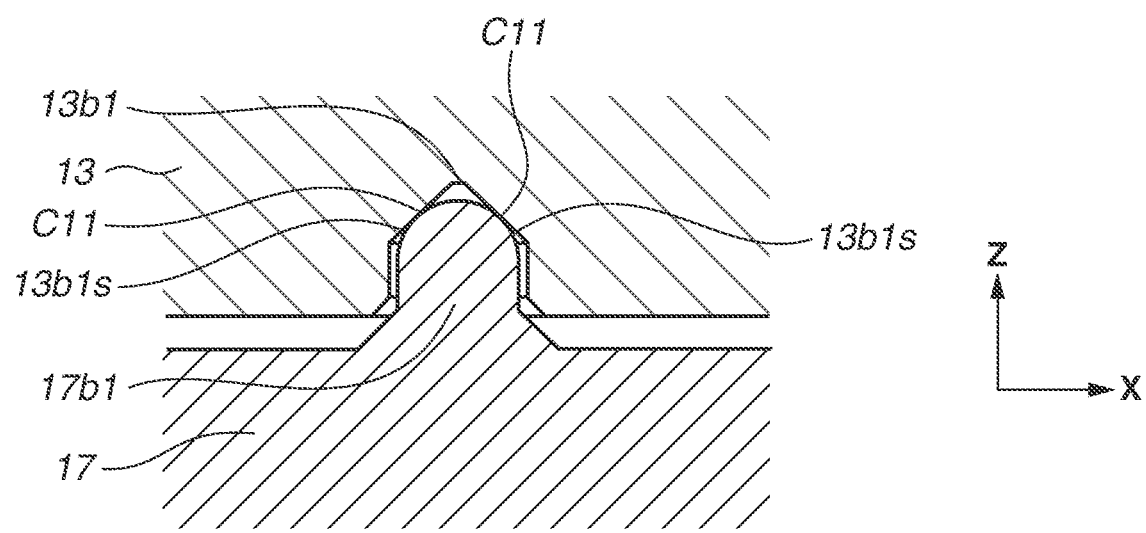
FIG. 9 is a partial sectional view illustrating a contact state where the base illustrated in FIG. 3 and the holding member are in contact with each other.
Figure 10:
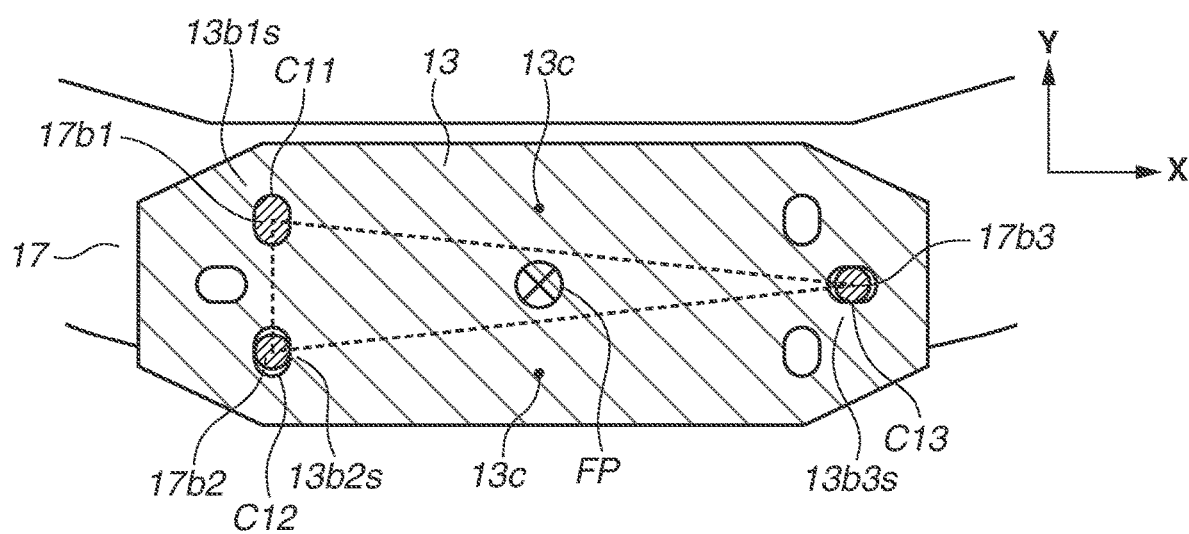
FIG. 10 is a partial sectional view illustrating the contact state where the base illustrated in FIG. 3 and the holding member are in contact with each other.

FIGS. 9 and 10 are sectional views of the stator unit 2 and illustrate the contact state on the first contact surface C11, the second contact surface C12, and the third contact surface C13. FIG. 9 is a sectional view of a section where the Y-direction (third direction) corresponds to the normal direction for the contact surface C11. FIG. 10 is a sectional view of a section where the Z-direction (first direction) corresponds to the normal direction for the position of the first contact surface C11, the second contact surface C12, and the third contact surface C13 in the holding member 13 in contact with the base 17.

The above-described inclinations will now be described. On the section illustrated in FIG. 9, a first inclined surface 13b1s has a normal line with a component in the Z-direction (first direction) and a component in the X-direction (second direction), and has an inclination at an angle with respect to the surface having a component in the Z-direction alone.

In the present exemplary embodiment, a surface where the normal line has components other than a component in the Z-direction (first direction) is defined as an inclined surface. In particular, a surface where the normal line has a component in the Z-direction and a component in the X-direction alone is represented as an inclined surface in the X-direction, and a surface where the normal line has a component in the Z-direction and a component in the Y-direction is represented as an inclined surface in the Y-direction. A surface where the normal line has a component in the Z-direction alone is defined as a surface with no inclination. An inclined surface is not limited to a flat surface. The normal direction (direction of the normal line) may continuously change. The following is a description on the assumption that the inclined surfaces include spherical surfaces and cylindrical surfaces.

In the section illustrated in FIG. 9, the first contact surface C11 is formed of the first inclined surface 13b1s of the first fitting hole portion 13b1 and the first fitting protrusion portion 17b1 in contact with each other. The pressure force between the base 17 and the holding member 13 acts on that inclined surface. As the pressure force acts in the normal direction, the pressure force can be resolved into two components: the force in the Z-direction (first direction) and the force in the X-direction (second direction). Specifically, the normal direction on the first contact surface C11 has a component in the first direction and a component in the second direction. The acting force and the counteracting force on the first contact surface C11 are generated in the X-direction (second direction), limiting the movement of the holding member 13 in the X-direction (second direction) relative to the base 17. Such action forces act on the first contact surface C11, the second contact surface C12, and the third contact surface C13.

Such action forces will be described with reference to FIG. 10. As described above with reference to FIG. 9, the first contact surface C11 formed of the first fitting protrusion portion 17b1 and the first inclined surface 13b1s of the first fitting hole portion 13b1 in contact with each other in the X-direction (second direction), as well as in the Y-direction (third direction) with a similar positional relationship. At the first contact surface C11, the movement of the holding member 13 relative to the base 17 in the X-direction (second direction) and the Y-direction (third direction) is limited.

The second contact surface C12 is formed of the second fitting protrusion portion 17b2 and a second inclined surface 13b2s of the second fitting hole portion 13b2 in contact with each other in the X-direction (second direction). At the second contact surface C12, the movement of the holding member 13 relative to the base 17 in the X-direction (second direction) is limited. The third contact surface C13 is formed of the third fitting protrusion portion 17b3 and a third inclined surface 13b3s of the third fitting hole portion 13b3 in contact with each other in the Y-direction (third direction). At the third contact surface C13, the movement of the holding member 13 relative to the base 17 is limited.

These action forces on the first contact surface C11, the second contact surface C12, and the third contact surface C13 limit the movement of the holding member 13 relative to the base 17 in the X-direction (second direction) and the Y-direction (third direction).

In FIG. 10, a point indicated by "FP" represents a position on which the resultant force of pressure forces acting on the vibrator 6 and the holding member 13 acts. The two pressure protrusion portions 13c described above correspond to portions that are dotted in FIG. 10 in a projective manner. Substantially identical pressure forces act on the two portions, the resultant of which acts on the middle point FP between the two portions. The contact surface has the middle point FP within the range surrounded by the first contact surface C11, the second contact surface C12, and the third contact surface C13, allowing the holding member 13 to be stably held with the pressure force.

Figure 11:
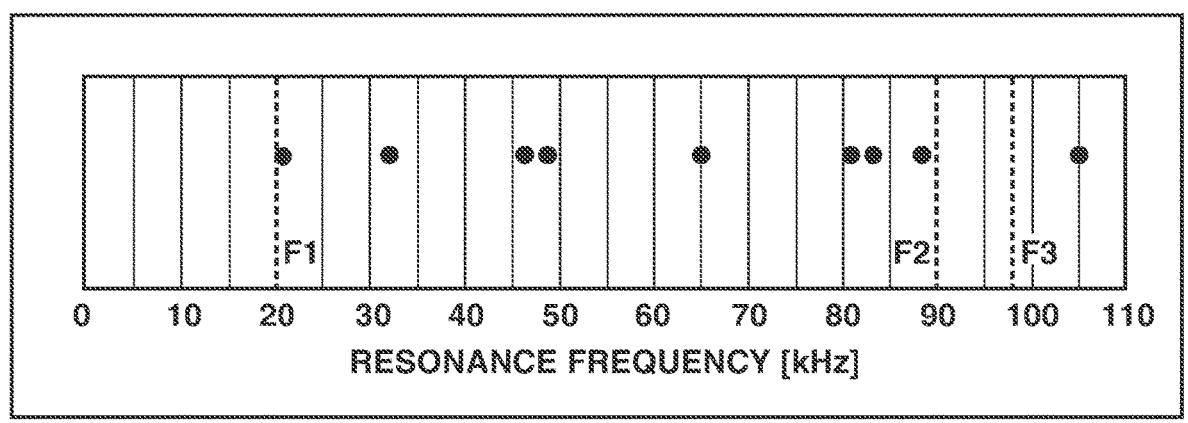
FIG. 11 is a graph illustrating resonance frequencies in vibration modes of the holding member.

The shape and material of the holding member 13 will be described in detail. FIG. 11 is a graph showing resonance frequencies calculated through a finite element method (FEM) for the vibration modes generated in the holding member 13 alone. In FIG. 11, the horizontal axis represents frequencies [kHz], and a black circle represents a resonance frequency in the vibration modes in the holding member 13. F1, F2, and F3 represent the upper limit (20 kHz) of frequencies in the audible range, the lower limit of driving frequencies of the vibration-type actuator 1, and the upper limit of driving frequencies for the vibration-type actuator 1, respectively. The frequencies in the audible range are generally in the range from 20 Hz to 20 kHz. With ultrasonic vibration excited in the vibrator 6, the holding member 13 receives vibration shifts of the vibrator 6 at the pressure protrusion portions 13c. The shape and material of the holding member 13 are determined to prevent the generation of an unwanted vibration in the holding member 13 that causes noise under the above-conditions.

Specifically, the shape and material of the holding member 13 are determined to prevent the resonance frequencies in the vibration modes in the holding member 13 from generating below the upper limit (20 kHz) of frequencies in the audible range.

Further, the shape and material of the holding member 13 are determined to prevent the resonance frequencies in the vibration modes in the holding member 13 from generating in the frequency range (frequencies in the range from F2 to F3 corresponding to the driving frequency range of the vibration-type actuator 1) of AC voltage applied to the piezoelectric element 12.

Figure 12A:
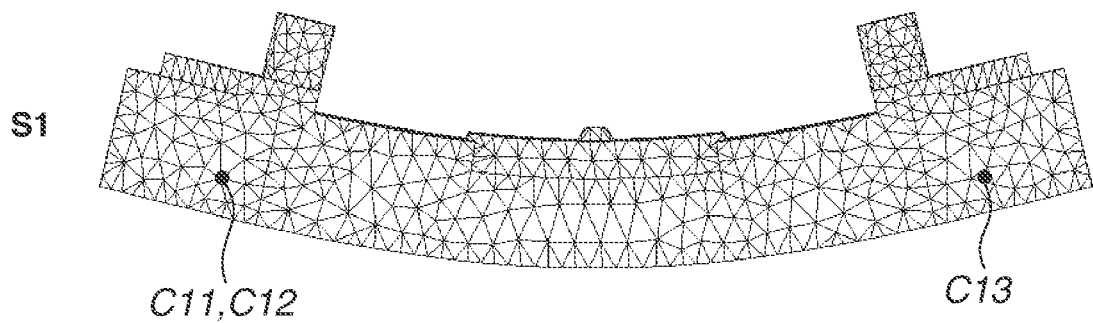
FIGS. 12A and 12B illustrate shapes in typical vibration modes of the holding member.
Figure 12B:
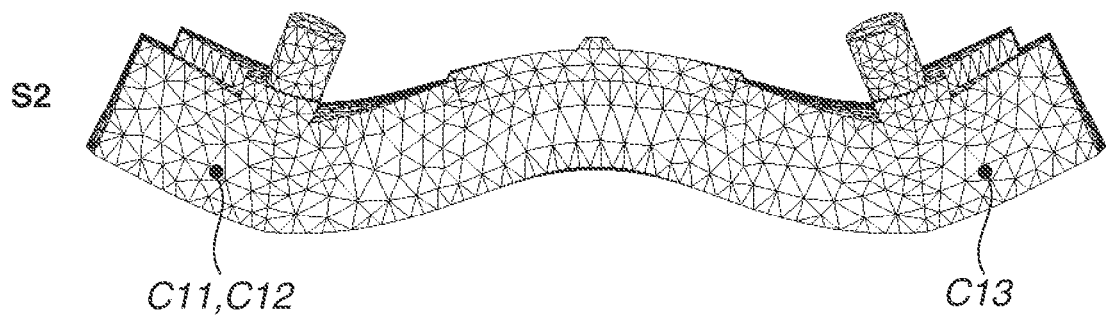

FIGS. 12A and 12B illustrate two vibration modes (a first vibration mode S1 and a second vibration mode S2), respectively, which are typical unwanted vibration modes that cause noise from the holding member 13. The two vibration modes are bending deformation vibration modes (bending vibration modes) (in which deformation in the first direction is dominant) that cause deformation in the Z-direction (first direction). The first vibration mode S1 and the second vibration mode S2 are likely to be excited with an exciting force from the vibrator 6.

The first contact surface C11, the second contact surface C12, and the third contact surface C13 are each formed to transmit the least vibration possible to the base 17 even if the first vibration mode S1 and the second vibration mode S2 are excited in the holding member 13 during the driving of the vibration-type actuator 1. For example, the first contact surface C11, the second contact surface C12, and the third contact surface C13 are formed at points of small vibration shifts in the first vibration mode S1 and the second vibration mode S2, that is, in the node vicinities or including nodes in the vibration modes.

As illustrated in FIG. 7, the holding member 13 has a substantially symmetrical shape with respect to the X-direction (second direction) and the Y-direction (third direction). That configuration is intended to make the first vibration mode S1, the second vibration mode S2 (see FIG. 12), and other vibration modes have a symmetrical shape.

A symmetrical shape of the vibration modes produces less complex behaviors of vibrations in the holding member 13, allowing reliable design for vibrations.

Figure 13:
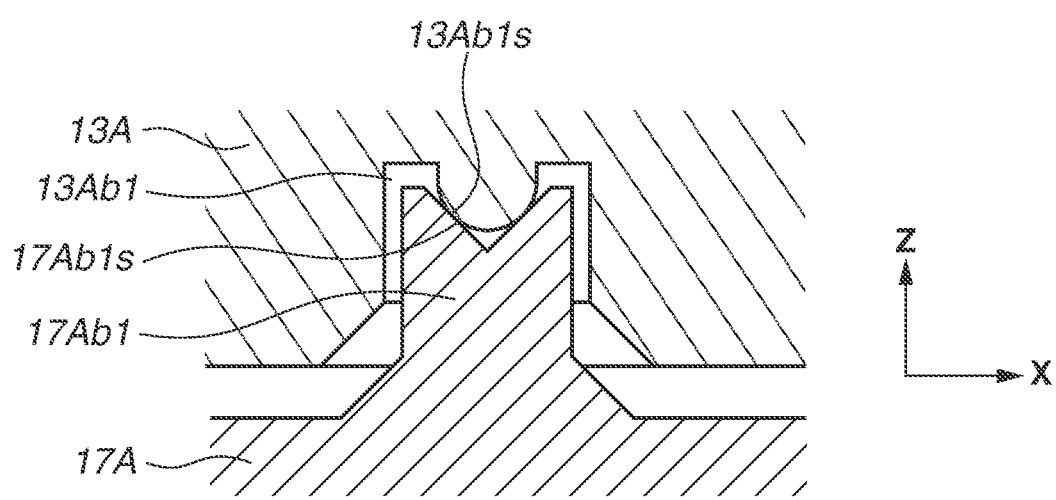
FIG. 13 is a partial sectional view illustrating another configuration of a contact surface according to the first exemplary embodiment.

FIG. 13 illustrates another configuration of the contact surface according to the present exemplary embodiment. FIG. 13 is a partial sectional view illustrating the first contact surface C11 formed of a first fitting hole portion 13Ab1 of a holding member 13A and a first fitting protrusion portion 17Ab1 of a base 17A in contact with each other.

A first inclined surface 13Ab1$s$ is formed in a protrusion shape from the bottom portion of the first fitting hole portion 13Ab1. A first receiving portion 17Ab1$s$, which is to be put in contact with the first inclined surface 13Ab1$s$, is formed at the tip end of the first fitting protrusion portion 17Ab1. The first inclined surface 13Ab1$s$ and the first receiving portion 17Ab1$s$ are in contact with each other, having similar effects to those described above with reference to FIG. 9.

Figure 14:
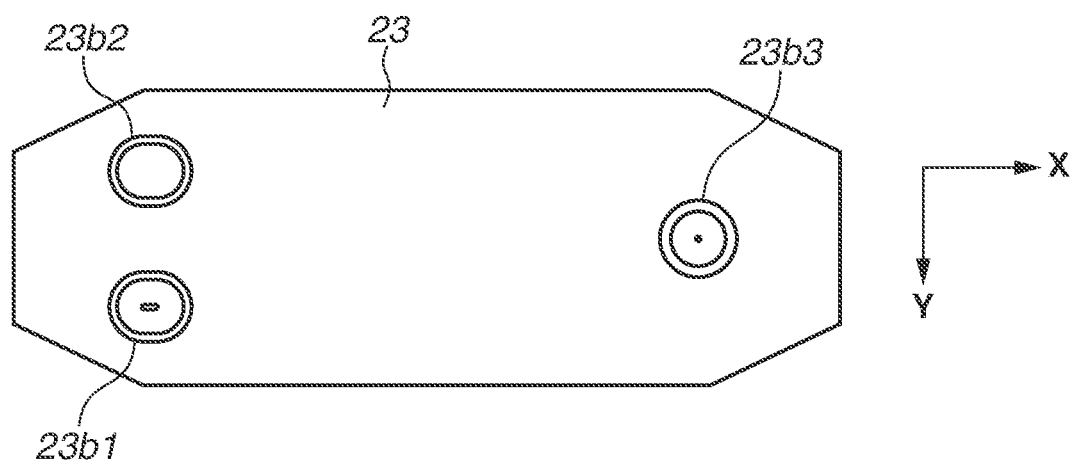
FIG. 14 is a bottom view of a holding member according to a second exemplary embodiment.
Figure 15:
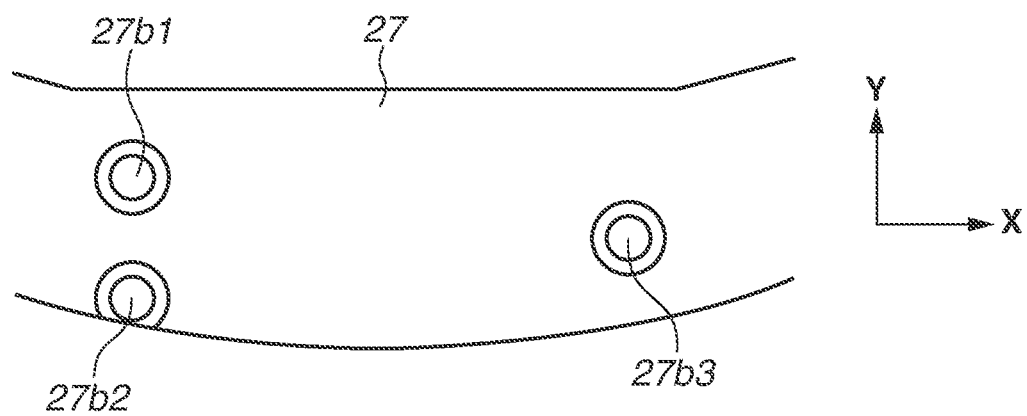
FIG. 15 is a partial plan view of a base according to the second exemplary embodiment.

A second exemplary embodiment will be described. FIG. 14 is a bottom view illustrating a holding member 23 in the vibration-type actuator 1 according to the second exemplary embodiment. FIG. 15 is a partial top view illustrating a base 27 of the vibration-type actuator 1 according to the second exemplary embodiment.

As illustrated in FIG. 14, a first fitting hole portion 23$b$1 has an elliptical shape with a longitudinal axis in the X-direction (second direction) as viewed in the Z-direction (first direction), and the bottom portion of the first fitting hole portion 23$b$1 is formed inclined in directions. A second fitting hole portion 23$b$2 has an elliptical shape with a longitudinal axis in the X-direction (second direction) as viewed in the Z-direction (first direction), and the bottom portion of the second fitting hole portion 23$b$2 is a flat surface with no inclination. A third fitting hole portion 23$b$3 has a substantially circular shape as viewed in the Z-direction (first direction), and the bottom portion of the third fitting hole portion 23$b$3 is formed inclined in directions.

Figure 16A:
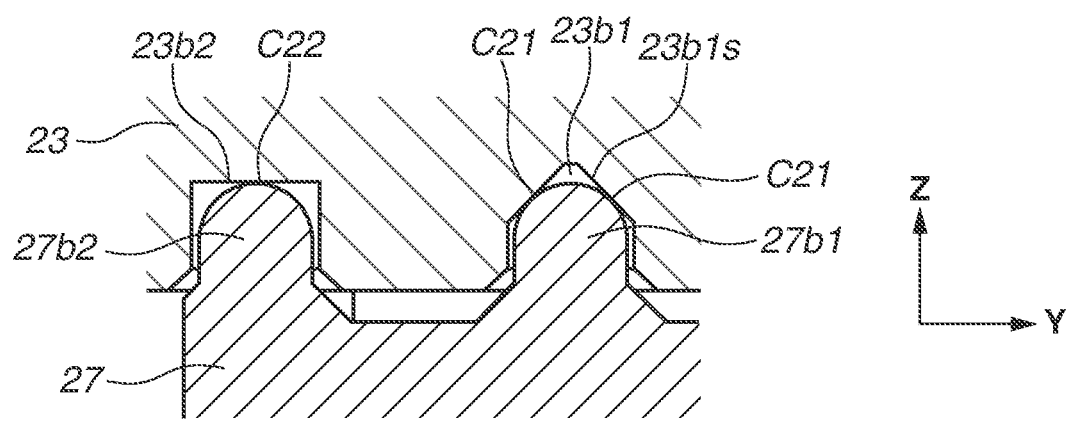
FIGS. 16A and 16B are sectional views illustrating contact positions of a base and a holding member illustrated in FIGS. 12A and 12B and FIG. 13.
Figure 16B:
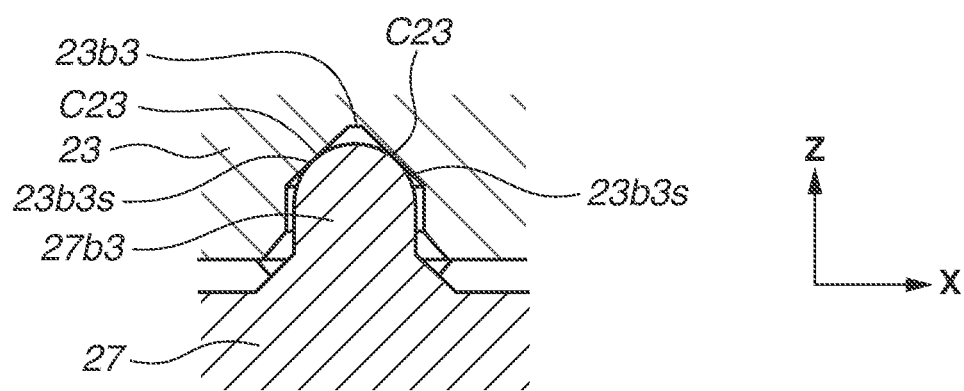

As illustrated in FIG. 15, a first fitting protrusion portion 27$b$1, a second fitting protrusion portion 27$b$2, and a third fitting protrusion portion 27$b$3 each have a substantially circular shape as viewed in the Z-direction (first direction), and the tip ends of the first fitting protrusion portion 27$b$1, the second fitting protrusion portion 27$b$2, and the third fitting protrusion portion 27$b$3 are formed in a substantially hemispherical shape. FIGS. 16A and 16B are partial sectional views of the first fitting hole portion 23$b$1, the second fitting hole portion 23$b$2, and the third fitting hole portion 23$b$3 in contact with the first fitting protrusion portion 27$b$1, the second fitting protrusion portion 27$b$2, and the third fitting protrusion portion 27$b$3, respectively, with the holding member 23 and the base 27 put together.

The first fitting hole portion 23$b$1 and the first fitting protrusion portion 27$b$1 are in contact with each other, forming a first contact surface C21 (see FIG. 16A). The third fitting hole portion 23$b$3 and the third fitting protrusion portion 27$b$3 are in contact with each other, forming a third contact surface C23 (see FIG. 16B). These contact conditions are similar to those of the first exemplary embodiment described above with reference to FIG. 9, and thus the descriptions thereof are omitted. As described above, the bottom surface of the second fitting hole portion 23$b$2 is a surface (surface with no inclination) where the normal line has a component in the Z-direction alone, and that surface is in contact with the tip end of the second fitting protrusion portion 27$b$2, forming a second contact surface C22 (see FIG. 16A).

Figure 17:
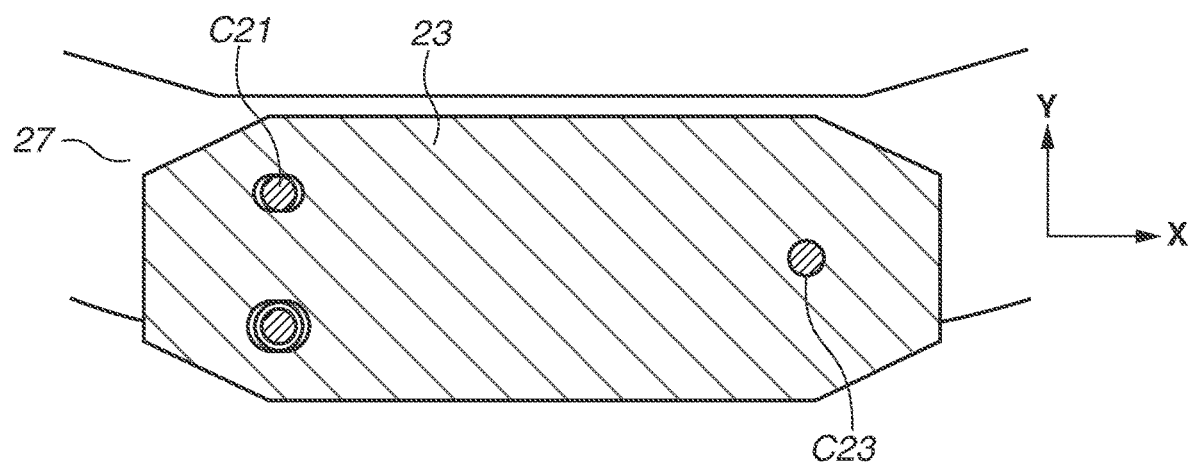
FIG. 17 is a sectional view illustrating the contact positions of the base and the holding member illustrated in FIGS. 12A and 12B and FIG. 13.

FIG. 17 is a sectional view of a section where the normal line has a component in the Z-direction alone at the height of the first contact surface C21 and the third contact surface C23. The position of the second contact surface C22 in the Z-direction (first direction) differs from those, and is not illustrated in FIG. 17. The third fitting protrusion portion 27$b$3 and a third inclined surface 23$b$3$s$ of the third fitting hole portion 23$b$3 are in contact with each other on the third contact surface C23 in the X-direction (second direction) and in the Y-direction (third direction). The contact surface C23 limits the movement of the holding member 23 relative to the base 27 in the X-direction (second direction) and the Y-direction (third direction).

The fitting protrusion portion 27$b$1 and a first inclined surface 23$b$1$s$ of the fitting hole portion 23$b$3 are in contact with each other on the first contact surface C21 in the Y-direction (third direction). The first contact surface C21 limits the movement of the holding member 23 relative to the base 27 in the Y-direction (third direction). The contact surfaces C21 and C23 have an effect to limit the movement of the holding member 23 relative to the base 27 in the X-direction (second direction) and the Y-direction (third direction). The first contact surface C21, the second contact surface C22, and the third contact surface C23 holds the holding member 23 on the base 27 in the Z-direction (first direction).

Figure 18:
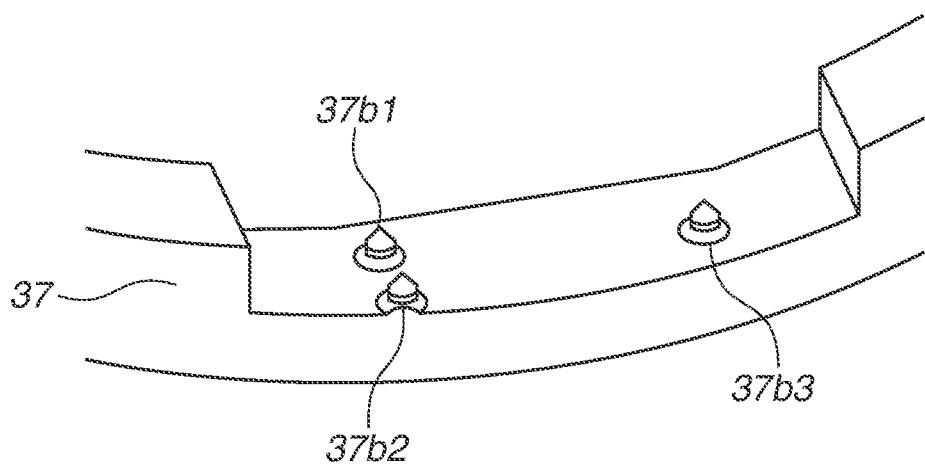
FIG. 18 is a partial perspective view illustrating a base according to a third exemplary embodiment.
Figure 19A:
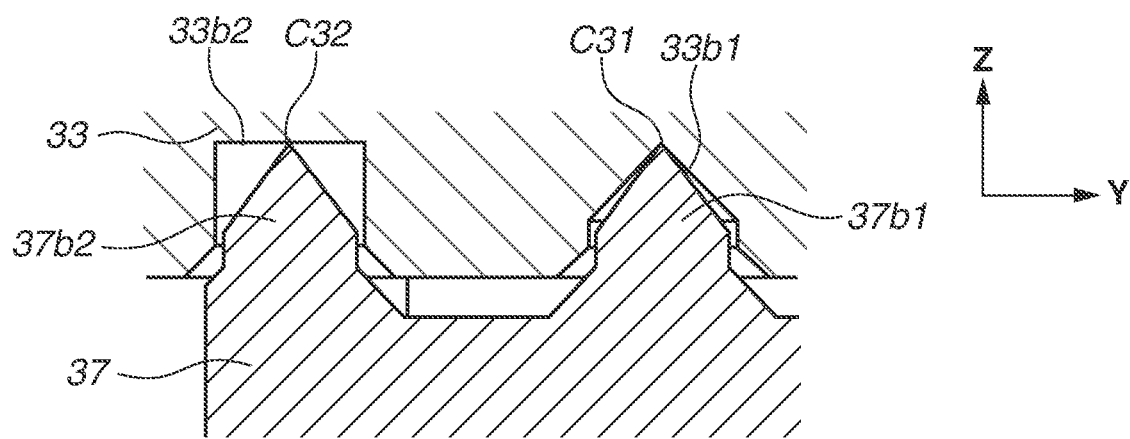
FIGS. 19A and 19B are partial sectional views illustrating a contact state where the base and a holding member according to the third exemplary embodiment are in contact with each other.
Figure 19B:
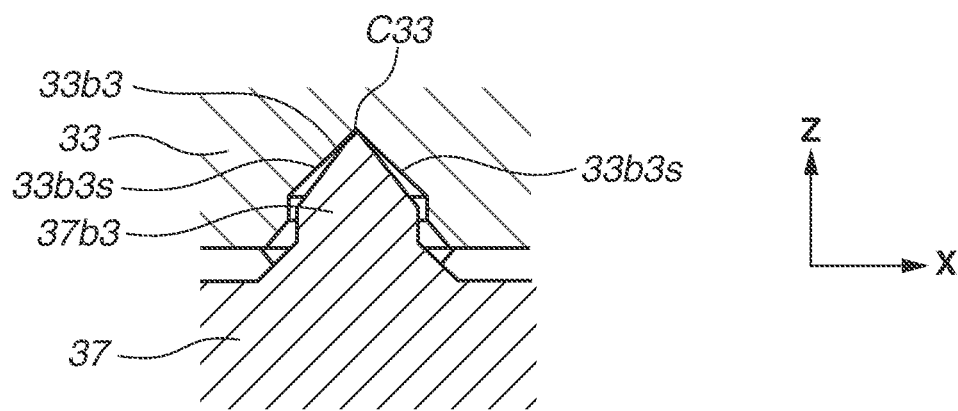

A third exemplary embodiment will be described. FIG. 18 is a partial perspective view of a base 37 according to the third exemplary embodiment. Fitting protrusion portions 37$b$1, 37$b$2, and 37$b$3, which are formed at three locations, respectively, have in a substantially circular shape as viewed in the Z-direction (first direction), and the tip end of each of the fitting protrusion portions 37$b$1, 37$b$2, and 37$b$3 is formed in a conical shape. FIGS. 19A and 19B are partial sectional views illustrating of fitting hole portions 33$b$1, 33$b$2, and 33$b$3 in contact with the fitting protrusion portions 37$b$1, 37$b$2, and 37$b$3, respectively, with a holding member 33 and the base 37 put together. The bottom surface of each of the fitting hole portions 33$b$1 and 33$b$3 of the holding member 33 is formed in a substantially conical shape.

The vertex of the conical shape of the fitting hole portion 33$b$1 and the vertex of the conical shape of the fitting protrusion portion 37$b$1 are in contact with each other, forming a first contact surface C31 (see FIG. 19A). The vertex of the conical shape of the fitting hole portion 33$b$3 and the vertex of the conical shape of the third fitting protrusion portion 37$b$3 are in contact with each other, forming a third contact surface C33 (see FIG. 19B). The bottom surface of the third fitting hole portion 33$b$2 is a surface (surface with no inclination) where the normal line has a component in the Z-direction. That surface is in contact with the tip end of the second fitting protrusion portion 37$b$2, forming a second contact surface C32 (see FIG. 19A).

The first contact surface C31 and the third contact surface C33 have an effect to limit the movement of the holding member 33 relative to the base 37 in the X-direction (second direction) and the Y-direction (third direction). The first contact surface C31, the second contact surface C32, and the third contact surface C33 holds the holding member 33 on the base 37 in the Z-direction (first direction).

Figure 20:
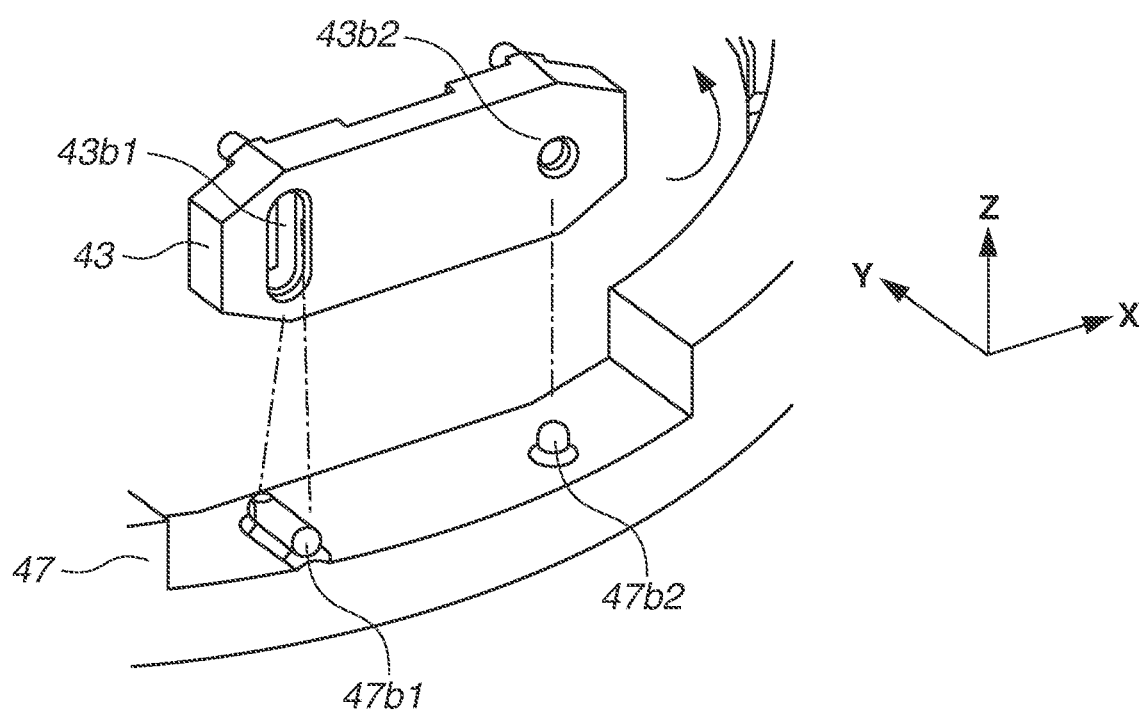
FIG. 20 is an exploded perspective view illustrating a base and a holding member according to a fourth exemplary embodiment.

A fourth exemplary embodiment will be described. FIG. 20 is a perspective view illustrating a holding member 43 and a base 47 according to the fourth exemplary embodiment. FIG. 20 illustrates the holding member 43 moved relative to the base 47 in the Z-direction (first direction) and rotated about the X-axis.

A fitting hole portion 43b1 of the holding member 43 has an elliptical shape with a long axis in the Y-direction (third direction) as viewed in the Z-direction (first direction), and the bottom surface of the fitting hole portion 43b1 has an inclined surface inclined in directions. A second fitting hole portion 43b2 has a substantially circular shape as viewed in the Z-direction (first direction), and the bottom surface of the second fitting hole portion 43b2 has an inclined surface inclined in directions.

The base 47 is provided with a first fitting protrusion portion 47b1, which extends in the Z-direction (first direction) and has an elliptical shape with a long axis in the Y-direction (third direction) as viewed in the Z-direction (first direction). The tip end of the first fitting protrusion portion 47b1 is chamfered.

The base 47 is provided with a fitting protrusion portion 47b2, which extends in the Z-direction (first direction) and has a substantially circular shape as viewed in the Z-direction (first direction). The tip end of the second fitting protrusion portion 47b2 is chamfered in a substantially hemispherical shape.

The first fitting hole portion 43b1 and the first fitting protrusion portion 47b1 are in contact with each other, forming a first contact surface C41. The normal direction on the first contact surface C41 has a component in the Z-direction (first direction) and a component in the Y-direction (third direction). The second fitting hole portion 43b2 and the second fitting protrusion portion 47b2 are in contact with each other, forming a second contact surface C42. The normal direction on the second contact surface C42 has a component in the Z-direction (first direction) and a component in the X-direction (second direction).

Figure 21:
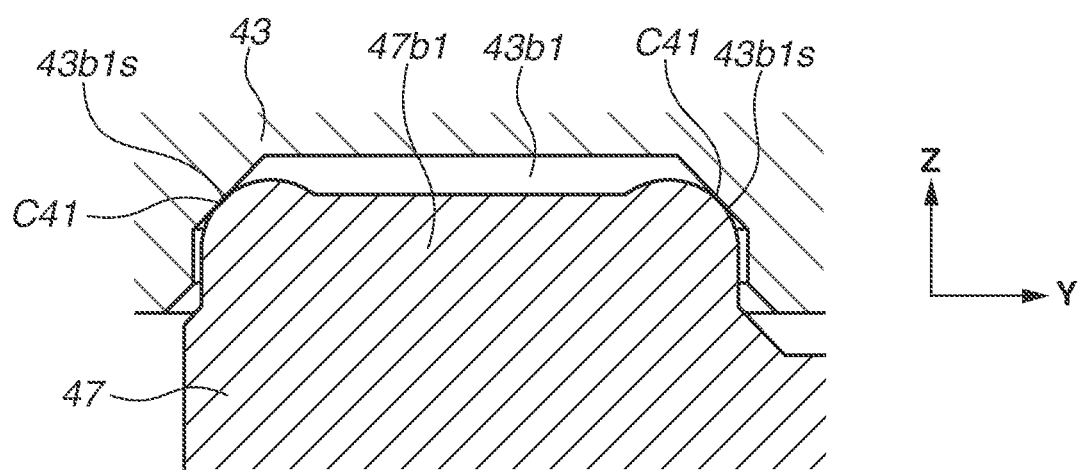
FIG. 21 is a partial sectional view illustrating a contact state where the base and the holding member according to the fourth exemplary embodiment are in contact with each other.

FIG. 21 is a partial sectional view illustrating the first fitting hole portion 43b1 of the holding member 43 and the first fitting protrusion portion 47b1 of the base 47 in contact with each other. The first fitting hole portion 43b1 and the first fitting protrusion portion 47b1 have a length in the Y-direction (third direction) and are in contact with each other in the vicinities of the both ends in the Y-direction (third direction), forming the first contact surface C41.

Thus, the formation of the first contact surface C41 enables a single fitting protrusion portion (first fitting protrusion portion 47b1) to limit the inclination about the X-axis. Further, the formation of the second contact surface C42 enables a single fitting protrusion portion (second fitting protrusion portion 47b2) to limit the inclination about the Y-axis. The first contact surface C41 and the second contact surface C42 limit the movement of the holding member 43 relative to the base 47 in the X-direction (second direction) and the Y-direction (third direction).

Figure 22:
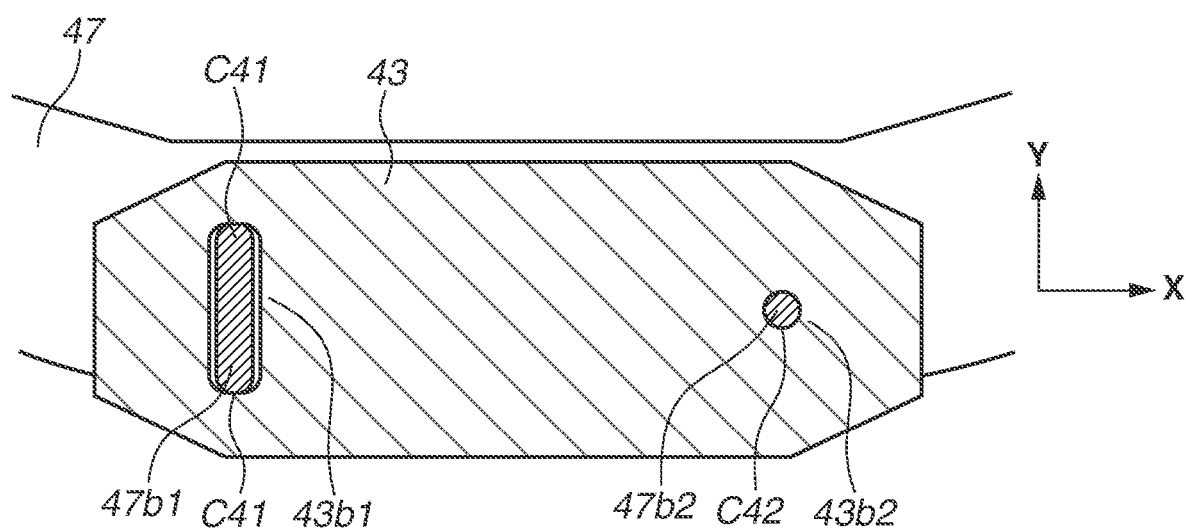
FIG. 22 is a partial sectional view illustrating the contact state where the base and the holding member according to the fourth exemplary embodiment are in contact with each other.

FIG. 22 is a sectional view illustrating a section in the Z-direction (first direction) as the normal direction at the height of the first contact surface C41 and the second contact surface C42. As described above with reference to FIG. 20, the first contact surface C41 forms in the vicinities of the both ends in the Y-direction (third direction). The second contact surface C42 forms in the X-direction (second direction) and the Y-direction (third direction). The first contact surface C41 and the second contact surface C42 limits the movement of the holding member 43 relative to the base 47 in the X-direction (second direction) and the Y-direction (third direction).

Figure 23:
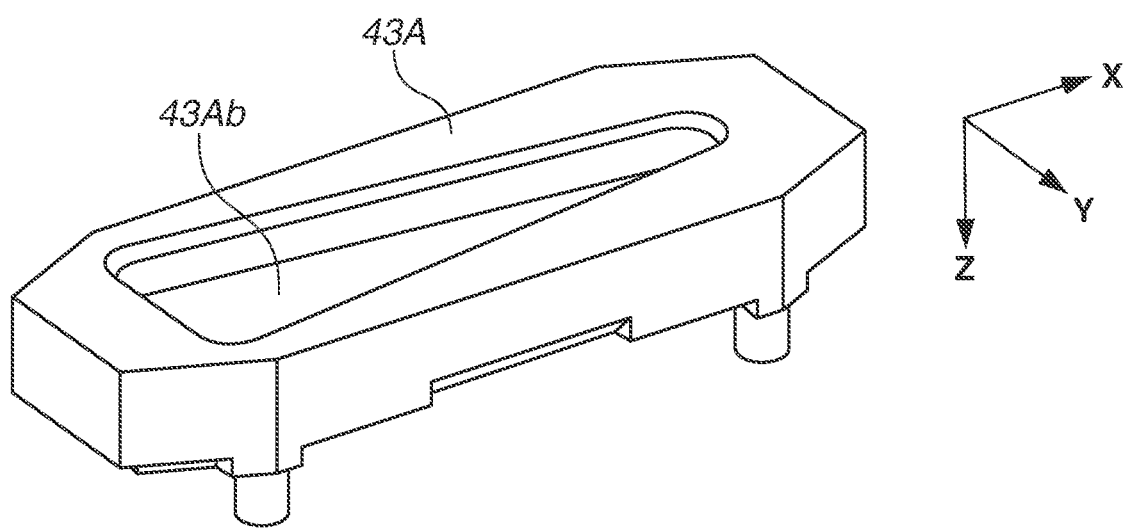
FIG. 23 is a partial sectional view illustrating another configuration of the holding member according to the fourth exemplary embodiment.

FIG. 23 is a partial sectional view illustrating another configuration of the holding member 43 according to the present exemplary embodiment. In a holding member 43A, a single fitting hole portion (first fitting hole portion 43Ab) is formed. A single fitting hole portion (first fitting hole portion 43Ab) and two fitting protrusion portions (first fitting protrusion portion 47b1 and second fitting protrusion portion 47b2) are in contact with each other, forming the first contact surface C41 and the second contact surface C42 as two contact surfaces. That configuration has the same effect as that of the holding member 43.

Figure 24:
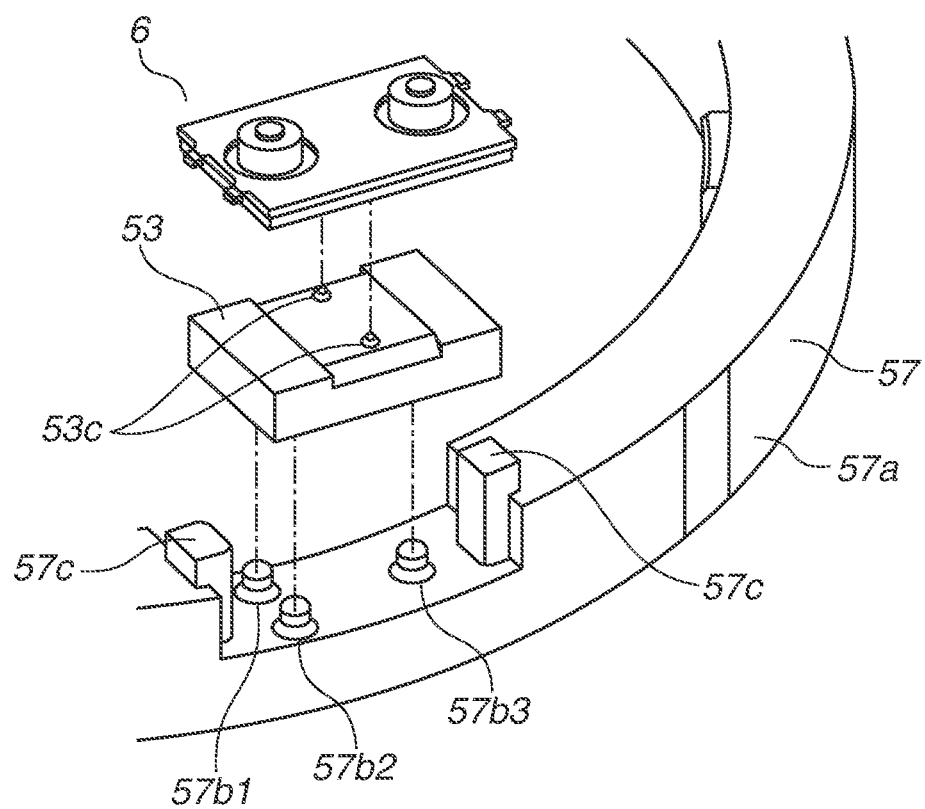
FIG. 24 is an exploded perspective view illustrating the configuration of a stator unit according to a fifth exemplary embodiment.

A fifth exemplary embodiment will be described. FIG. 24 is an exploded perspective view illustrating a base 57 and a holding member 53 to be put in contact with each other used for the vibration-type actuator 1 according to the fifth exemplary embodiment. The base 57 includes three fitting protrusion portions (a first fitting protrusion portion 57b1, a second fitting protrusion portion 57b2, and a third fitting protrusion portion 57b3). The holding member 53 is provided with three fitting hole portions (a first fitting hole portion 53b1, a second fitting hole portion 53b2, and a third fitting hole portion 53b3) similar to the fitting hole portions 23b1 to 23b3 of the holding member 23 illustrated in FIG. 14.

The three fitting protrusion portions of the base 57 and the three hole portions of the holding member 53 are in contact with each other, limiting the movement of the holding member 53 relative to the base 57. The holding member 53 and the vibrator 6 are in contact with each other at pressure protrusion portions 53c on the holding member 53. The vibrator 6 is supported with two guide portions 57c formed on the base 57 limiting the movement of the vibrator 6 relative to the base 57 in the X-direction (second direction) and the Y-direction (third direction).

Figure 25:
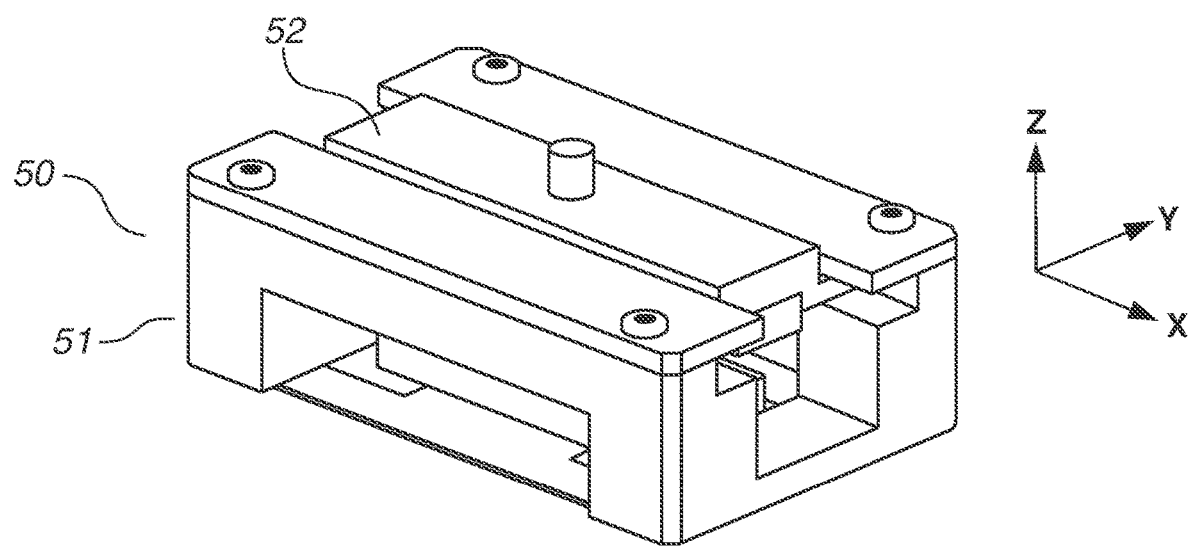
FIG. 25 is a perspective view illustrating the configuration of a vibration-type actuator according to a sixth exemplary embodiment.
Figure 26:
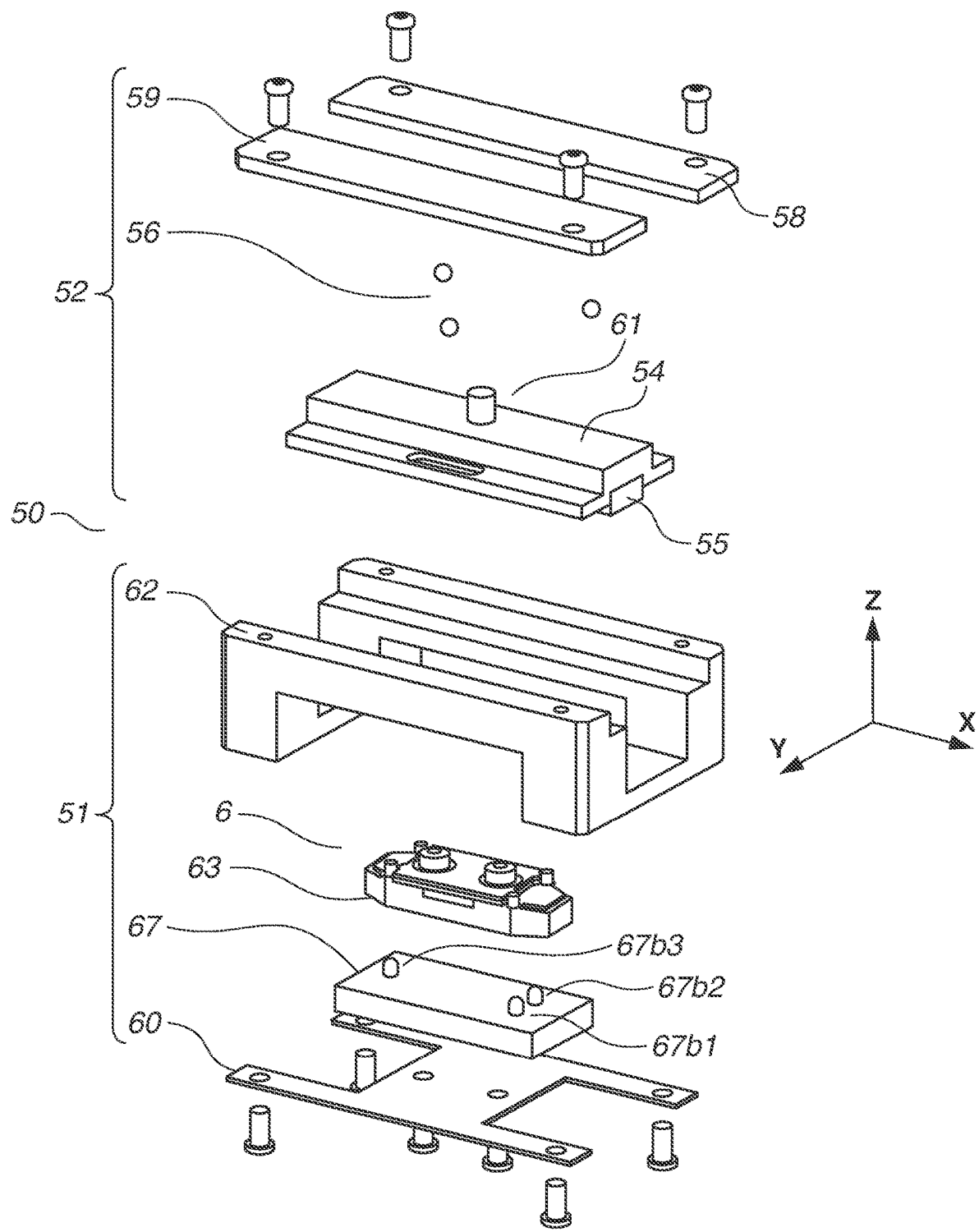
FIG. 26 is an exploded perspective view illustrating the configuration of the vibration-type actuator according to the sixth exemplary embodiment.

A sixth exemplary embodiment will be described. FIG. 25 is a perspective view illustrating a vibration-type actuator 50 according to the sixth exemplary embodiment. FIG. 26 is an exploded perspective view of the vibration-type actuator 50. The vibration-type actuator 50 is roughly composed of a driven unit 52 and a stator unit 51. The driven unit 52 is surrounded by the stator unit 51, and is linearly movable in the X-axis direction relative to the stator unit 51 as described below. The driven unit 52 includes a driven object frame 54, an output transmission portion 61, and a sliding member 55.

The stator unit 51 includes the vibrator 6, a holding member 63, a base 67, a pressure spring 60, a support frame 62, a first rail 59, and a second rail 58. The base 67 is held on the support frame 62 through the pressure spring 60. The pressure spring 60 is shifted in the Z-direction (first direction), applying a pressure force to the vibrator 6 and the sliding member 55. The vibrator 6 is held on the base 67 through the holding member 63.

The holding member 63 has the same shape as the holding member 13 as described above with reference to FIG. 4. As described above with reference to FIG. 3 and other drawings, the base 67 is provided with a first fitting protrusion portion 67b1, which has the same shape as the first fitting protrusion portion 17b1, a second fitting protrusion portion 67b2, which has the same shape as the second fitting protrusion portion 17b2, and a third fitting protrusion portion 67b3, which has the same shape as the third fitting protrusion portion 17b3. Contact surfaces are formed with the base 67 in contact with a first fitting hole portion 63b1, a second fitting hole portion 63b2, and a third fitting hole portion 63b3 of the holding member 63.

The first rail 59 and the second rail 58 are each fixed to the corresponding upper portion of the support frame 62. In the driven unit 52, the sliding member 55 is joined to the recess formed in the central bottom portion of the driven object frame 54 with an adhesive.

The sliding member 55 is a member to receive the frictional driving force from the vibrator 6 to slide with the rectangular portion 11a. The output transmission portion 61 is fixed by, for example, screwing near or at the center of the upper surface of the driven object frame 54. The driven object frame 54 has steel ball guide grooves extending in the X-axis direction. Each steel ball 56 is provided in one steel ball guide groove. Surfaces on the first rail 59 and the second rail 58 opposite to each steel ball guide groove include steel ball receiving portions (not illustrated).

The pressure force generated by the pressure spring 60 is transmitted through the sliding member 55 to the driven object frame 54. That pressure force presses the driven object frame 54 against the first rail 59 and the second rail 58 through the steel balls 56. That configuration holds the driven unit 52 on the stator unit 51 in such a manner that the driven unit 52 is movable in the X-axis direction by the rolling motion of the steel balls 56.

That configuration allows the driven unit 52 to be moved in the X-axis direction.

A seventh exemplary embodiment will be described. The above-described vibration-type actuators 1 and 50 can be widely applied to electronic apparatuses including a member to be positioned by driving of a vibration-type actuator. For example, the vibration-type actuators 1 and 50 can be used as a drive source in various applications, such as driving of a lens of an image capturing apparatus (optical device), rotational driving of a photosensitive drum of a copying machine, and driving of a stage. An image capturing apparatus (optical device) equipped with the vibration-type actuator 1 used in driving lenses disposed in the lens barrel will now be described by way of example with reference to FIGS. 27A and 27B.

Figure 27A:
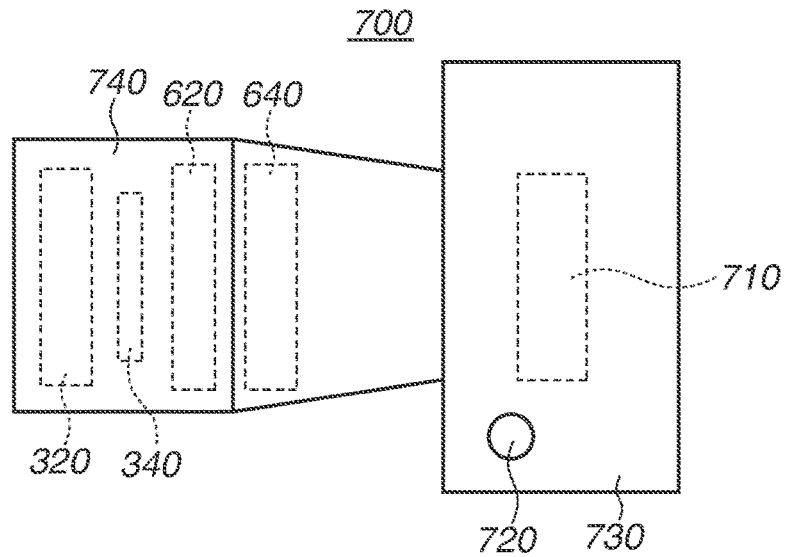
FIG. 27A is a top view illustrating a schematic configuration of an image capturing apparatus according to a seventh exemplary embodiment.

FIG. 27A is a top view illustrating a schematic configuration of an image capturing apparatus 700. The image capturing apparatus 700 includes a camera body 730 with an image sensor 710 and a power supply button 720 mounted thereon. The image capturing apparatus 700 further includes a lens barrel 740 including a first lens unit (not illustrated), a second lens unit 320, a third lens unit (not illustrated), a fourth lens unit 340, and vibration-type driving devices (vibration-type actuators) 620 and 640. The lens barrel 740 is detachably mountable on the camera body 730 as an exchangeable lens.

In the image capturing apparatus 700, the vibration-type driving device 620 drives the second lens unit 320 to position. In the image capturing apparatus 700, the vibration-type driving device 640 drives the fourth lens unit 340 to position. The vibration-type driving devices 620 and 640 each include the vibration-type actuator 1 and a mechanism of converting the output from the vibration-type actuator 1. For example, the rotation of the driven body (rotor 71) in the vibration-type driving device 620 is converted into linear motion in the optical axis direction with gears and other components, adjusting the position of the second lens unit 320 in the optical axis direction. The vibration-type driving device 640 may also have the same configuration as described above.

Figure 27B:
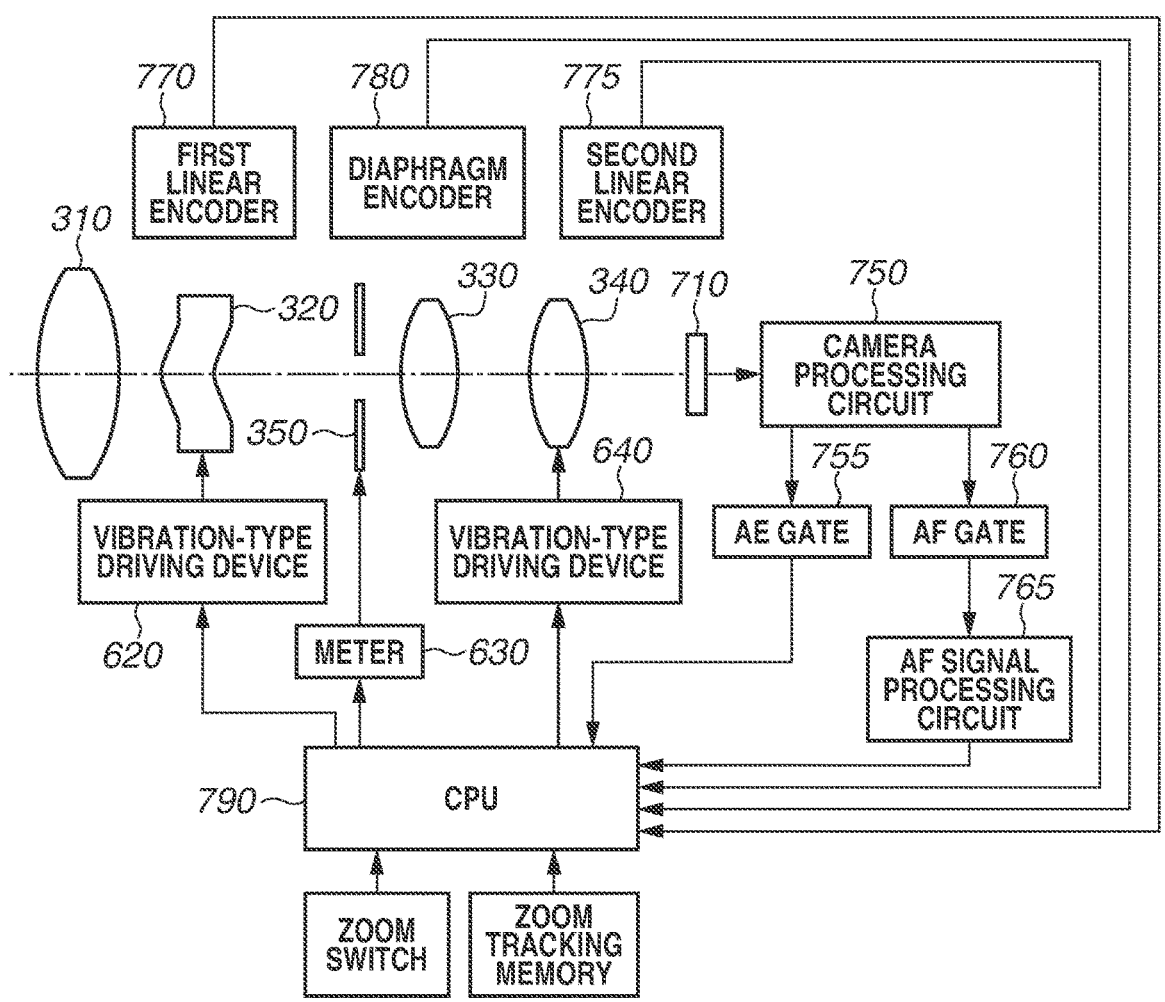
FIG. 27B is a block diagram illustrating a schematic configuration of the image capturing apparatus according to the seventh exemplary embodiment.

FIG. 27B is a block diagram illustrating a schematic configuration of the image capturing apparatus 700. A first lens unit 310, the second lens unit 320, a third lens unit 330, the fourth lens unit 340, and a light quantity adjustment unit 350 are arranged at predetermined positions on the optical axis in the lens barrel 740. Light that has passed through the first lens unit 310 to the fourth lens unit 340 and through the light quantity adjustment unit 350 is focused on the image sensor 710. The image sensor 710 converts the optical image into an electric signal, and outputs the electric signal. The output electric signal is transmitted to a camera processing circuit 750.

The camera processing circuit 750 performs amplification, gamma correction, and other adjustments on the output signal from the image sensor 710. The camera processing circuit 750 is connected to a central processing unit (CPU) 790 through an AE gate 755, and is connected to the CPU 790 through an AF gate 760 and an AF signal processing circuit 765. The video signal that has undergone predetermined processing in the camera processing circuit 750 is transmitted to the CPU 790 through the AE gate 755, the AF gate 760, and the AF signal processing circuit 765. The AF signal processing circuit 765 extracts the high-frequency component from the video signal, generates an evaluation value signal in autofocus (AF), and supplies the generated evaluation value to the CPU 790.

The CPU 790 is a control circuit to control the general operation of the image capturing apparatus 700, and generates a control signal used in exposure determination or focusing based on the acquired video signal. The CPU 790 controls the vibration-type driving devices 620 and 640 and a meter 630 to provide the determined exposure and the appropriate focus, adjusting the positions of the second lens unit 320, the fourth lens unit 340, and the light quantity adjustment unit 350 in the optical axis direction.

Under the control of the CPU 790, the vibration-type driving device 620 moves the second lens unit 320 along the optical axis, and the vibration-type driving device 640 moves the fourth lens unit 340 along the optical axis. Driving of the light quantity adjustment unit 350 is controlled by the meter 630.

The position in the optical axis direction of the second lens unit 320 driven by the vibration-type driving device 620 is detected by a first linear encoder 770. The detection result is sent to the CPU 790 for feedback in driving of the vibration-type driving device 620. Similarly, the position in the optical axis direction of the fourth lens unit 340 driven by the vibration-type driving device 640 is detected by a second linear encoder 775. The detection result is sent to the CPU 790 for feedback in driving of the vibration-type driving device 640.

The position of the light quantity adjustment unit 350 in the optical axis direction is detected by a diaphragm encoder 780. The detection result is sent to the CPU 790 for feedback in driving of the meter 630. The use of the vibration-type driving devices 620 and 640 including the vibration-type actuator 1 makes it possible to drive the lenses and other components of the image capturing apparatus 700 with more accuracy and efficiency.

The present disclosure has been described in detail above with reference to the exemplary embodiments. However, the present disclosure is not limited to the specific exemplary embodiments, and various modifications within the gist of the disclosure are also included in the present disclosure. Each above-described exemplary embodiment is a mere exemplary embodiment of the present disclosure, and the exemplary embodiments can be combined as appropriate.

According to an aspect of the present disclosure, a vibration-type actuator is provided that prevents decrease in output efficiency and generation of noise, and an electronic apparatus including the vibration-type actuator is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-208356, filed Dec. 16, 2020, which is hereby incorporated by reference herein in its entirety.

What is claimed is:

1. A vibration-type actuator comprising:
   a vibrator having an elastic member and an electromechanical energy conversion element fixed to the elastic member;
   a contact body configured to contact the vibrator;
   a pressure member configured to press the contact body and the vibrator in a first direction;
   a holding member configured to hold the vibrator and having a support portion and at least one fitting hole portion extending in the first direction, wherein the support portion is configured to support the vibrator movably in the first direction; and
   a base configured to hold the holding member,
   wherein the contact body is configured to move relative to the vibrator in a second direction intersecting the first direction, and
   wherein the base includes at least one fitting protrusion portion extending in the first direction and configured to be fitted in the at least one fitting hole portion.

2. The vibration-type actuator according to claim 1, wherein a normal direction on a contact surface where the at least one fitting hole portion and the at least one fitting protrusion portion are in contact with each other has a component in the first direction and a component in a third direction intersecting the first direction and the second direction.

3. The vibration-type actuator according to claim 1, wherein a normal direction on a contact surface where the at least one fitting hole portion and the at least one fitting protrusion portion are in contact with each other has a component in the first direction and a component in the second direction.

4. The vibration-type actuator according to claim 3, wherein the holding member further includes:
   a first fitting protrusion portion, a second fitting protrusion portion, and a third fitting protrusion portion as the at least one fitting protrusion portion,
   a first fitting hole portion, a second fitting hole portion, and a third fitting hole portion as the at least one fitting hole portion, and
   a first contact surface, a second contact surface, and a third contact surface,
   wherein the first contact surface is a contact surface where the first fitting protrusion portion and the first fitting hole portion are put in contact with each other by pressing of the pressure member, the second contact surface is a contact surface where the second fitting protrusion portion and the second fitting hole portion are put in contact with each other by pressing of the pressure member, and the third contact surface is a contact surface where the third fitting protrusion portion and the third fitting hole portion are put in contact with each other by pressing of the pressure member.

5. The vibration-type actuator according to claim 4, wherein a tip end of any one of the first fitting protrusion portion, the second fitting protrusion portion, and the third fitting protrusion portion contacts a bottom portion of one of the first fitting hole portion, the second fitting hole portion, and the third fitting hole portion.

6. The vibration-type actuator according to claim 3, wherein the holding member further includes:
   a first fitting protrusion portion and a second fitting protrusion portion as the at least one fitting protrusion portion,
   a first fitting hole portion and a second fitting hole portion as the at least one fitting hole portion, and
   a first contact surface and a second contact surface,
   wherein the first contact surface is a contact surface where the first fitting protrusion portion and the first fitting hole portion are put in contact with each other by pressing of the pressure member, and the second contact surface is a contact surface where the second fitting protrusion portion and the second fitting hole portion are put in contact with each other by pressing of the pressure member.

7. The vibration-type actuator according to claim 6, wherein a tip end of at least one of the first fitting protrusion portion or the second fitting protrusion portion contacts a bottom portion of one of the first fitting hole portion and the second fitting hole portion.

8. The vibration-type actuator according to claim 3, wherein the holding member further includes:
   a first fitting protrusion portion and a second fitting protrusion portion as the at least one fitting protrusion portion,
   a first fitting hole portion as the at least one fitting hole portion, and
   a first contact surface and a second contact surface,
   wherein the first contact surface is a contact surface where the first fitting protrusion portion and the first fitting hole portion are put in contact with each other by pressing of the pressure member, and the second contact surface is a contact surface where the second fitting protrusion portion and the first fitting hole portion are put in contact with each other by pressing of the pressure member.

9. The vibration-type actuator according to claim 8, wherein a tip end of at least one of the first fitting protrusion portion or the second fitting protrusion portion contacts a bottom portion of one of the first fitting hole portion and the second fitting hole portion.

10. The vibration-type actuator according to claim 3, wherein the contact surface is formed such that the contact surface includes a node in a bending vibration mode of the holding member with deformation in the first direction.

11. The vibration-type actuator according to claim 1, wherein the holding member further includes a pressure protrusion portion configured to press a node common to two different vibration modes in the vibrator.

12. The vibration-type actuator according to claim 1, wherein the holding member does not include a vibration mode in which frequencies in a driving frequency range of the vibration-type actuator are resonance frequencies.

13. The vibration-type actuator according to claim 1, wherein the holding member does not include a vibration mode in which frequencies in an audible range are resonance frequencies.

14. The vibration-type actuator according to claim 13, wherein the frequencies in the audible range are in a range from 20 Hz to 20 kHz.

15. The vibration-type actuator according to claim 1, wherein the holding member has a symmetrical shape with respect to the second direction and a third direction intersecting the first direction and the second direction.

16. An electronic apparatus comprising:
    the vibration-type actuator according to claim 1; and
    a member to be positioned by driving of the vibration-type actuator.

* * * * *